United States Patent
Noh et al.

(10) Patent No.: US 11,709,594 B2
(45) Date of Patent: Jul. 25, 2023

(54) MOBILE TERMINAL AND CONTROL METHOD THEREFOR

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/035,553

(22) Filed: Sep. 28, 2020

(65) Prior Publication Data

US 2022/0035523 A1    Feb. 3, 2022

(30) Foreign Application Priority Data

Jul. 30, 2020    (WO) ................ PCT/KR2020/010047

(51) Int. Cl.
*G06F 1/16*    (2006.01)
*G06F 3/0488*    (2022.01)
(Continued)

(52) U.S. Cl.
CPC ........ *G06F 3/04886* (2013.01); *G06F 1/1624* (2013.01); *G06F 1/1652* (2013.01);
(Continued)

(58) Field of Classification Search
CPC ............... G06F 3/04883; G06F 3/0488; G06F 3/04886; G06F 3/0482; G06F 3/017;
(Continued)

(56) References Cited

U.S. PATENT DOCUMENTS

2010/0095219 A1* 4/2010 Stachowiak ........ G06F 16/9562
715/745
2010/0298033 A1* 11/2010 Lee ....................... G06F 1/1616
455/566

(Continued)

FOREIGN PATENT DOCUMENTS

EP    3531230    1/2020
KR    101659032    9/2016
(Continued)

OTHER PUBLICATIONS

PCT International Application No. PCT/KR2020/010047, International Search Report dated Apr. 27, 2021, 9 pages.

(Continued)

*Primary Examiner* — Dismery Mercedes
(74) *Attorney, Agent, or Firm* — Lee, Hong, Degerman, Kang & Waimey PC

(57) ABSTRACT

A mobile terminal and a control method therefor are disclosed. The mobile terminal includes a body, an input unit configured to receive user input, a display coupled to the body to vary a display region viewed from a front face of the body according to switching between an enlarged display mode and a reduced display mode, and a controller. The controller controls output of at least one application on the display in the enlarged display mode, and controls, upon receiving an event, output of an application corresponding to the event in a first region based on a signal for confirming the received event. The first region is an event application region when a preset application is being output in the enlarged display mode and is a main region of the enlarged display mode when the preset application is not being output in the enlarged display mode.

14 Claims, 28 Drawing Sheets

(51) Int. Cl.
  *G06F 3/04886* (2022.01)
  *H04M 1/72448* (2021.01)
  *G06F 3/04812* (2022.01)
(52) U.S. Cl.
  CPC ........ *G06F 3/0488* (2013.01); *G06F 3/04812* (2013.01); *H04M 1/72448* (2021.01); *G06F 2203/04102* (2013.01); *G09G 2354/00* (2013.01); *G09G 2380/02* (2013.01)
(58) Field of Classification Search
  CPC ........ G06F 3/041; G06F 9/451; G06F 1/1652; G06F 1/1624; G06F 1/1656; G06F 1/1601; G06F 1/1641; G06F 1/1647; G06F 1/1675; G06F 1/1637; G06F 2203/04102; G06F 3/0481; G06F 3/04817; G06F 2203/04803; G06F 3/04842; G06F 3/0412; G06F 3/0416; G09G 2380/02; G09G 3/035; G09G 2354/00
  See application file for complete search history.

(56) References Cited

U.S. PATENT DOCUMENTS

| | | | | |
|---|---|---|---|---|
| 2014/0204037 A1* | 7/2014 | Kim | ............ | G06F 3/03 345/173 |
| 2015/0278990 A1* | 10/2015 | Lee | ............ | G06F 3/048 345/665 |
| 2015/0331593 A1* | 11/2015 | Lee | ............ | G06F 1/1641 345/667 |
| 2016/0062515 A1* | 3/2016 | Bae | ............ | G06F 3/0416 345/174 |
| 2016/0132074 A1* | 5/2016 | Kim | ............ | G06F 1/1652 345/173 |
| 2017/0104855 A1 | 4/2017 | Lee et al. | | |
| 2017/0147189 A1* | 5/2017 | Ryu | ............ | G06F 3/04817 |
| 2017/0169741 A1* | 6/2017 | Li | ............ | H04M 1/0237 |
| 2019/0261519 A1* | 8/2019 | Park | ............ | H04M 1/0268 |
| 2020/0174661 A1* | 6/2020 | Liang | ............ | H04M 1/72448 |
| 2021/0109653 A1* | 4/2021 | Choi | ............ | H04M 1/0245 |
| 2021/0181801 A1* | 6/2021 | Yin | ............ | H04M 1/0237 |
| 2021/0405857 A1* | 12/2021 | Kim | ............ | G06F 1/1624 |
| 2022/0130287 A1* | 4/2022 | Feng | ............ | H01L 27/3241 |

FOREIGN PATENT DOCUMENTS

| | | |
|---|---|---|
| KR | 1020170034614 | 3/2017 |
| KR | 1020170046977 | 5/2017 |
| KR | 1020170100484 | 9/2017 |
| WO | 2019160345 | 8/2019 |

OTHER PUBLICATIONS

European Patent Office Application Serial No. 20215227.8, Search Report dated Jun. 11, 2021, 10 pages.

* cited by examiner (a)

(b)

(a)

(b)

(a)

(b)

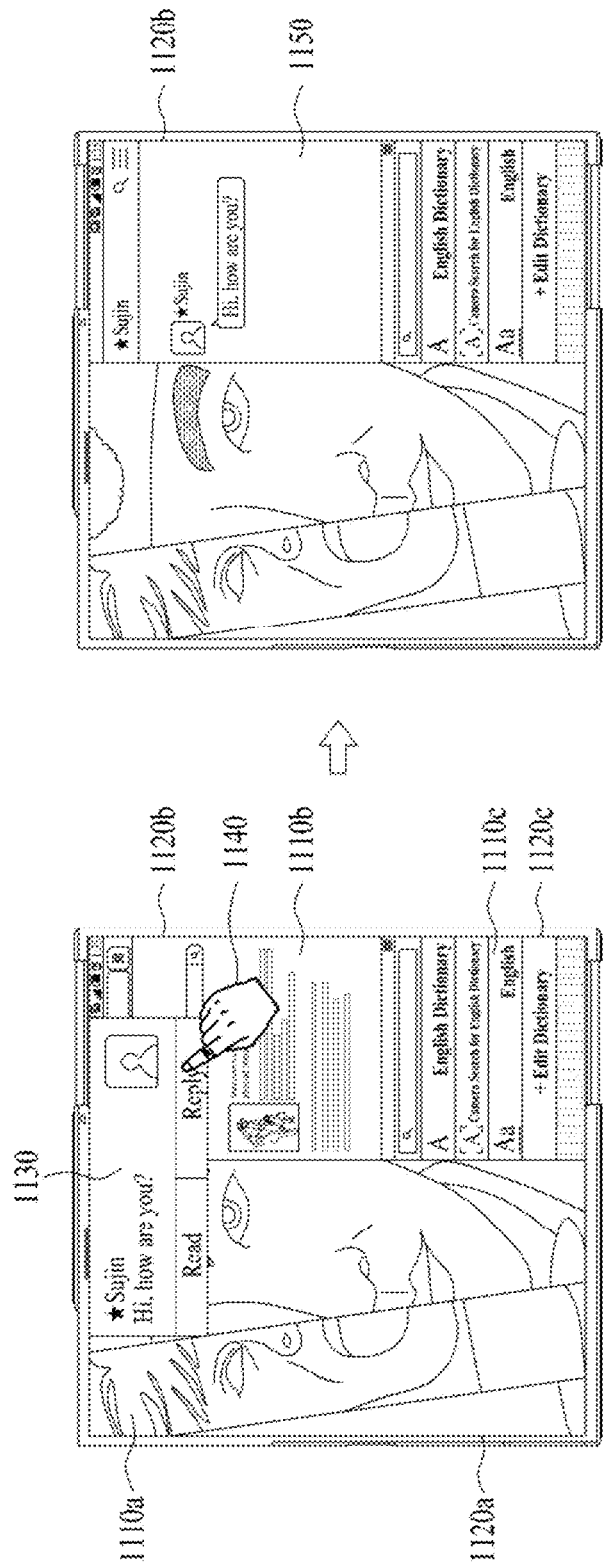

MOBILE TERMINAL AND CONTROL METHOD THEREFOR

CROSS-REFERENCE TO RELATED APPLICATION(S)

Pursuant to 35 U.S.C. § 119 (a), this application claims the benefit of an earlier filing date and right of priority to International Application No. PCT/KR2020/010047 filed on Jul. 30, 2020, the contents of which are hereby incorporated by reference herein in its entirety.

BACKGROUND

Field

The present disclosure relates to a mobile terminal and a control method therefor. More specifically, the present disclosure relates to a mobile terminal for receiving an event in an enlarged display mode or a reduced display mode, and a control method therefor.

Discussion of the Related Art

Terminals may be classified into mobile/portable terminals or stationary terminals according to mobility thereof. Mobile terminals may also be classified into handheld terminals or vehicle mounted terminals according to whether or not a user can directly carry the terminal.

Functions of mobile terminals are diversifying. For example, the functions include data and voice communication, photography and video capture using a camera, voice recording, music file playback through a speaker system, and image or video output on a display. Some terminals additionally have an electronic gaming function or perform multimedia player functions. Particularly, recent mobile terminals may receive multicast signals that provide visual content such as broadcast, video, or television programs.

As functions of such terminals are diversified, the terminals are implemented in the form of a multimedia player equipped with composite functions such as photograph or video capture, music or video file playback, and broadcast reception.

To support and increase the functions of the terminals, improvement of a structural part and/or software part of the terminals may be considered.

Recently, a flexible display having sufficient elasticity and capable of large deformation has been developed. The size of a mobile terminal can be varied using the deformable nature of the flexible display.

In spite of the variable size of the mobile terminal, since a display region viewed from a front face of a display of the mobile terminal is not varied, there has been only an embodiment in which, upon receiving an event, the mobile terminal outputs an application corresponding to the event on a full screen.

Further, even when the mobile terminal uses a split display region, there has been a problem about where the mobile terminal is to output an application corresponding to an event upon receiving the event.

SUMMARY

An object of the present disclosure is to solve the above problem and other problems.

An object of the present disclosure is to provide a mobile terminal for controlling output of an application corresponding to an event when the event is received in an enlarged display mode or a reduced display mode, and a control method therefor.

To achieve these objects and other advantages and in accordance with the purpose of the disclosure, as embodied and broadly described herein, a mobile terminal includes a body, an input unit configured to receive user input, a display coupled to the body to vary a display region viewed from a front face of the body according to switching between an enlarged display mode and a reduced display mode, and a controller. The controller controls output of at least one application on the display in the enlarged display mode, and controls, upon receiving an event, output of an application corresponding to the event in a first region based on a signal for confirming the received event. The first region is an event application region when a preset application is being output in the enlarged display mode and is a main region of the enlarged display mode when the preset application is not being output in the enlarged display mode.

According to an aspect of the present disclosure, the preset application may be a video playback application.

According to an aspect of the present disclosure, the controller may control output of an event generation window corresponding to the received event and control output of the application corresponding to the event in a second region based on a first signal for selecting the event generation window.

According to an aspect of the present disclosure, the event application region may be a region with a history in which the application corresponding to the event has been executed.

According to an aspect of the present disclosure, the controller may control output of the application corresponding to the event in a pop-up window based on a second signal for selecting the event generation window.

According to an aspect of the present disclosure, the event generation window may be output in a region with a history in which the application corresponding to the event has been executed.

According to an aspect of the present disclosure, the controller may control output of a visual effect to indicate a region in which the application corresponding to the event is capable of being output based on the signal for confirming the event while one application is being output on a full screen in the enlarged display mode, upon receiving the event.

According to an aspect of the present disclosure, the controller may control output of a setting window and control, based on a third signal for selecting an item included in the setting window, output of an application corresponding to the item in a third region.

According to an aspect of the present disclosure, provided herein is a mobile terminal including a body, an input unit configured to receive user input, a display coupled to the body to vary a display region viewed from a front face of the body according to switching between an enlarged display mode and a reduced display mode, and a controller. The controller controls output of a first application on the display in the reduced display mode, and controls, upon receiving an event, output of an application corresponding to the event in a first region based on a first signal for confirming the event.

According to an aspect of the present disclosure, the first region may be a display region viewed from a rear face of the body.

According to an aspect of the present disclosure, the controller may switch the display to the enlarged display mode based on the first signal, and the first region may be the display region viewed from the front face of the body.

According to an aspect of the present disclosure, the controller may control output of the first application in a display region viewed from a rear face of the body based on the first signal and control output of the application corresponding to the event in the display region viewed from the front face of the body.

According to an aspect of the present disclosure, the controller may determine a position of the first region based on an input direction of the first signal.

According to an aspect of the present disclosure, provided herein is a method of controlling a mobile terminal including a display coupled to a body to vary a display region viewed from a front face of the body according to switching between an enlarged display mode and a reduced display mode. The method includes outputting at least one application on the display in the enlarged display mode and outputting, upon receiving an event, an application corresponding to the event in a first region based on a signal for confirming the event. The first region is an event application region when a preset is being output in the enlarged display mode and is a main region of the enlarged display mode when the preset application is not being output in the enlarged display mode.

According to an aspect of the present disclosure, provided herein is a method of controlling a mobile terminal including a display coupled to a body to vary a display region viewed from a front face of the body according to switching between an enlarged display mode and a reduced display mode. The method includes controlling output of a first application on the display in the reduced display mode and controlling, upon receiving an event, output of an application corresponding to the event in a first region based on a first signal for confirming the event.

Further scopes of applicability of the present disclosure will become apparent from the following detailed description.

However, those skilled in the art may understand that various modifications and changes may be possible within the concept and scope of the present disclosure and the detailed description and specific examples, such as exemplary embodiments of the disclosure, will be given by way of illustration only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 11A to 11C are diagrams illustrating embodiments of outputting an application corresponding to an event in an enlarged display mode in a mobile terminal according to an embodiment of the present disclosure;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
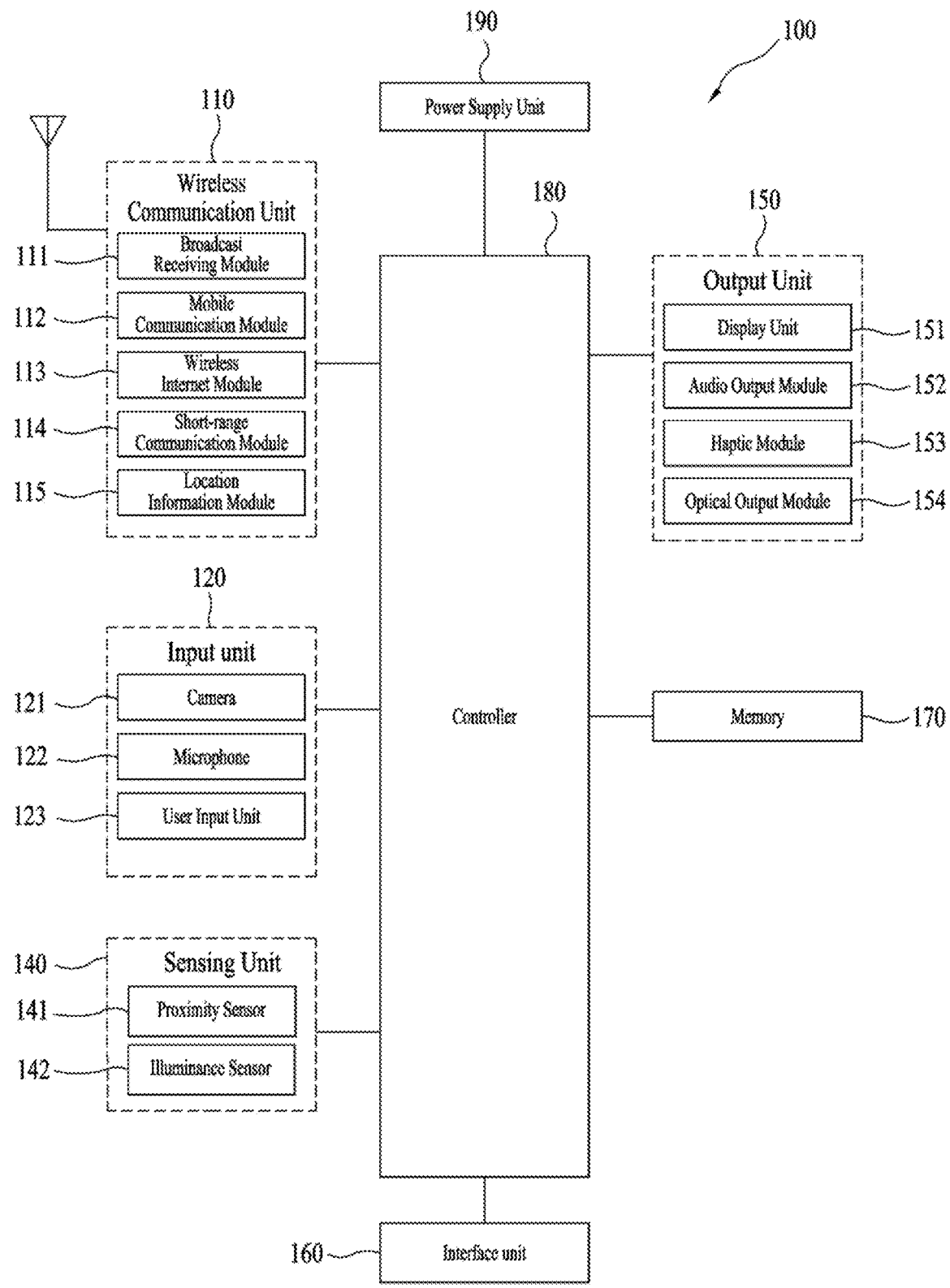
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless region networks. One example of the wireless region networks is a wireless personal region networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
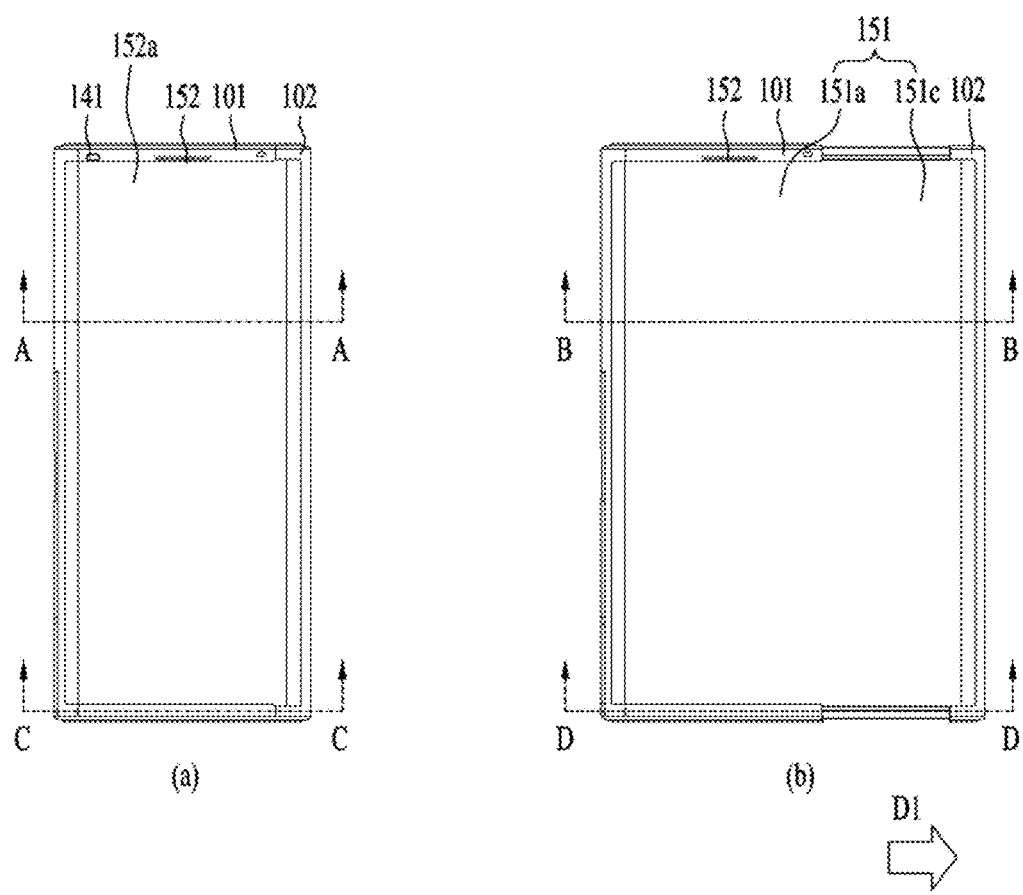
FIG. 2 is a front view of a first state and a second state of the mobile terminal in accordance with an embodiment.
Figure 3:
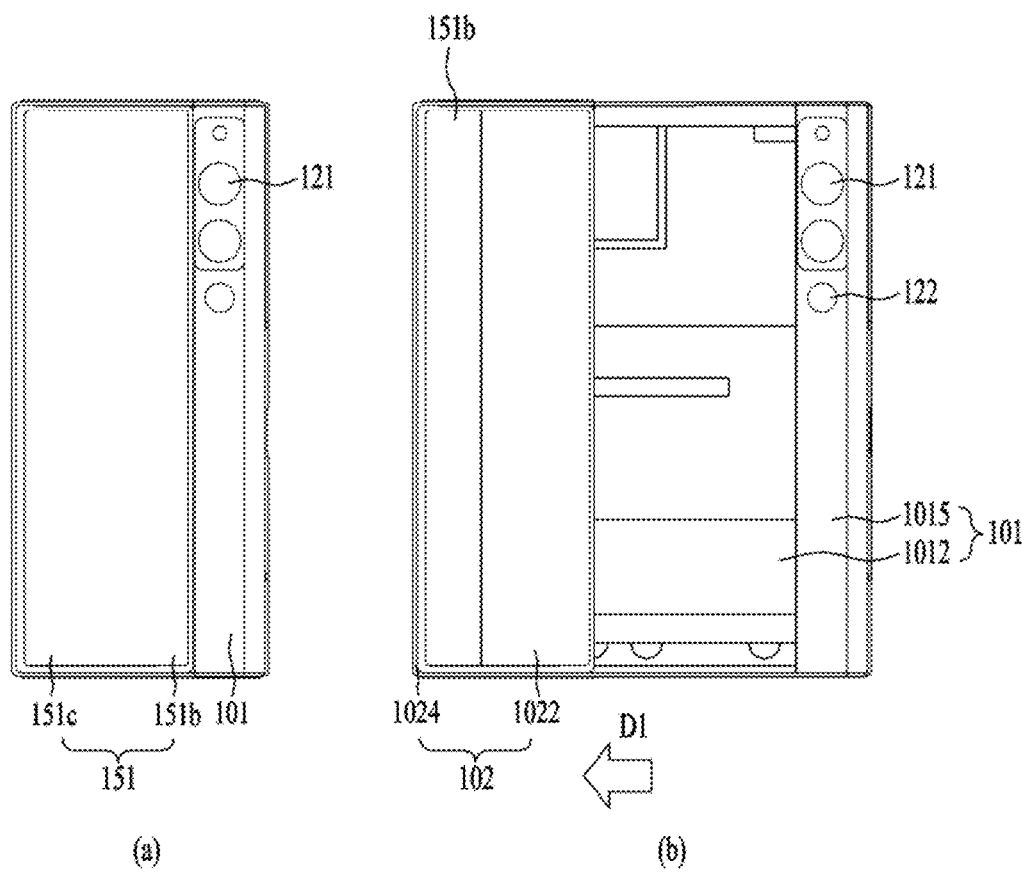
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and region on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the region thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the region of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, a region of rear face of the display unit 151 decreases as a region of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the region of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
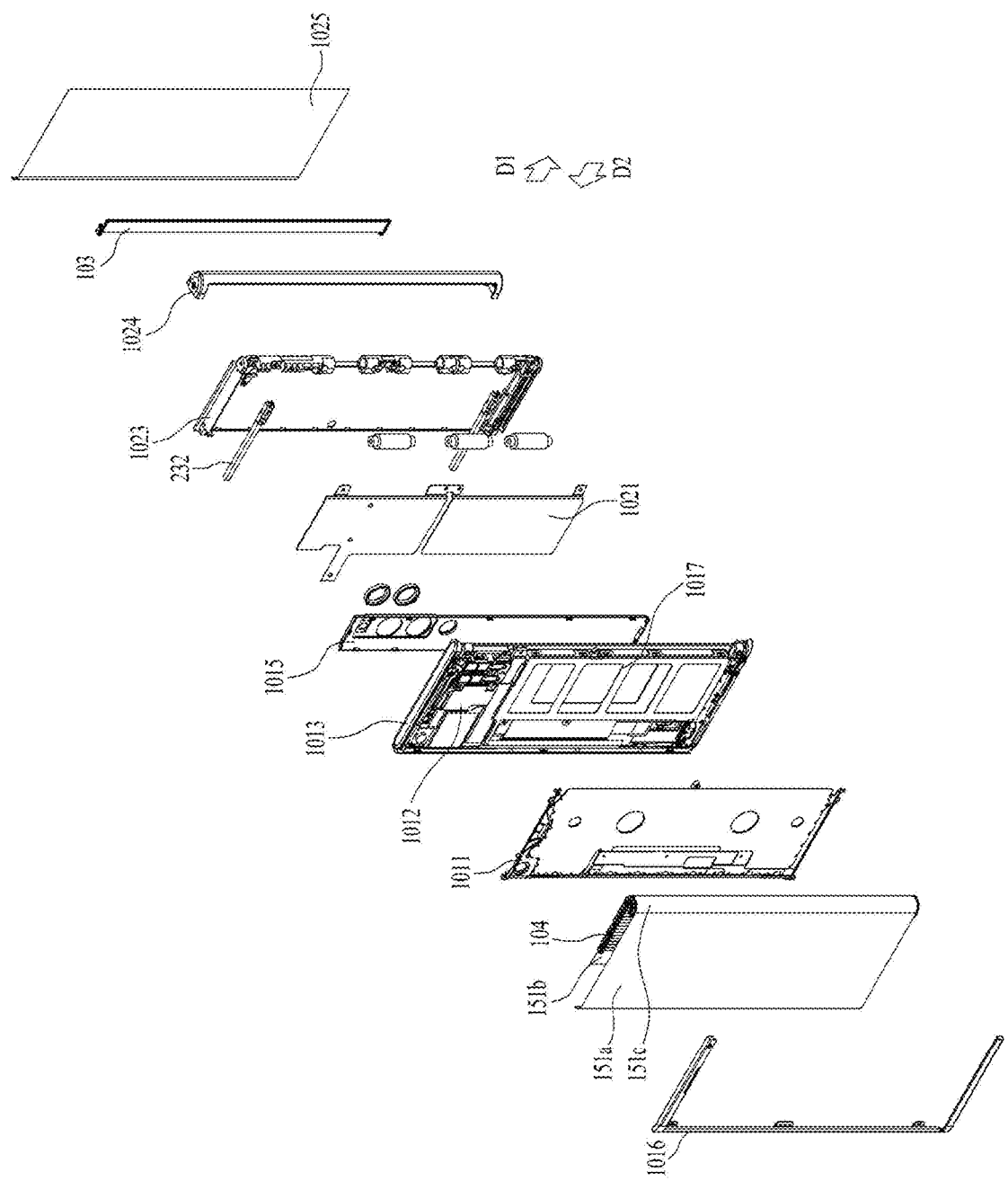
FIGS. 4 and 5 are exploded perspective views of the mobile terminal in accordance with an embodiment.
Figure 5:
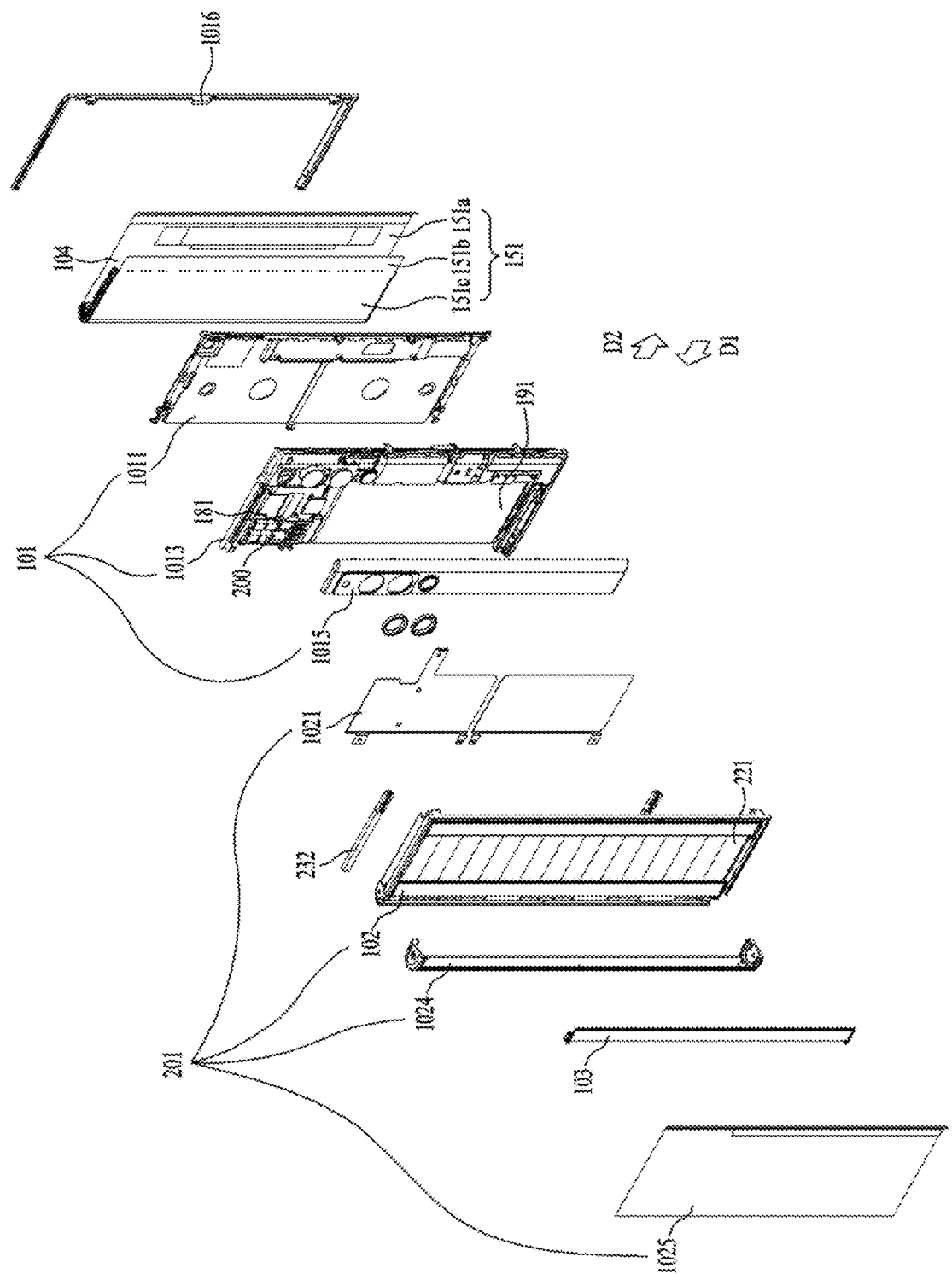

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151*a* and 151*b* and a variable portion 151*c*. The fixed portion 151*a* and 151*b* means a portion fixed to the frame. Because of being fixed to the frame, the fixed portion 151*a* and 151*b* maintains a constant shape without changing a bending degree. On the other hand, the variable portion 151*c* means a portion in which a bending angle or a position of the bent portion changes. The variable portion 151*c* in which the position or bending angle of the bent portion changes requires a structure for supporting a rear face of the variable portion 151*c* in response to the change.

The fixed portion 151*a*, 151*b* is coupled to the first frame of the display unit and is always positioned on the front face of the display unit to form a portion of the front face of the display unit. The variable portion 151*c* includes a side face located at a side portion of the mobile terminal, and a position of the side face varies depending on the position of the second frame. Based on a side face, a region of a portion disposed on the front face of the display unit and a region of a portion disposed on the rear face of the display unit vary. That is, a portion of the variable portion 151*c* may be the front face and another portion of the variable portion 151*c* may be the rear face based on the first and second states. The variable portion 151*c* is positioned in the first direction with respect to the fixed portion 151*a*, 151*b* relative to the mobile terminal, and an end of the variable portion 151*c* is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(*a*), and may be exposed rearward in the second state as shown in FIG. 3(*b*).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

Figure 6:
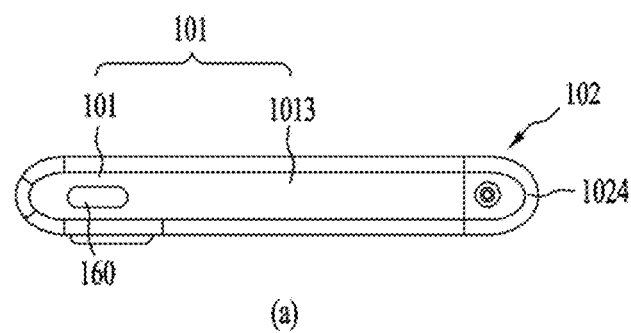
FIG. 6 is a side view of the mobile terminal as viewed from a third direction.
Figure 6:
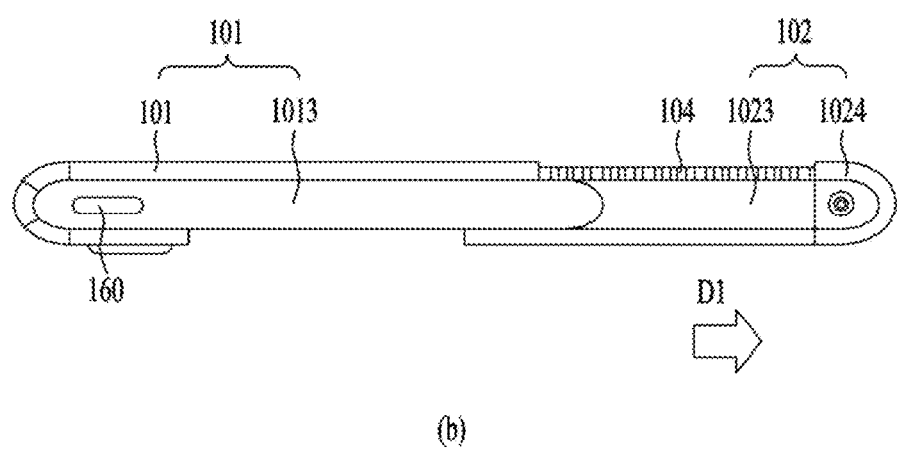

FIG. 6 is a side view of the mobile terminal as viewed from a third direction. FIG. 6 illustrates the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151*a* disposed on the front of the mobile terminal 100, a second region 151*b* coupled to a slide frame 103 positioned on the rear of the mobile terminal 100, and a third region 151*c* located between the first region 151*a* and the second region 151*b* and bent around the roller 210. The third region 151*c* may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the roller 210. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

Figure 7:
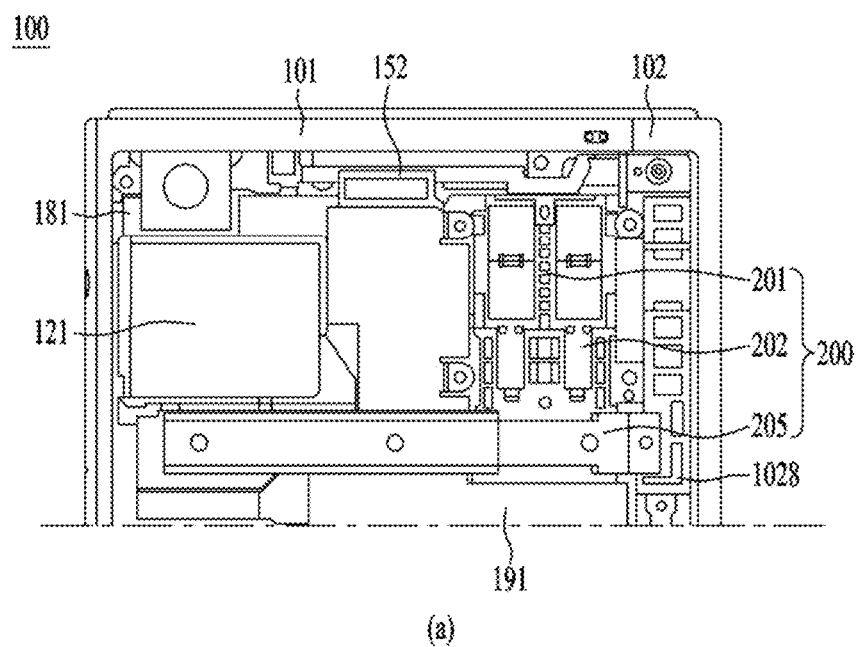
FIG. 7 is a view showing a driving unit of the mobile terminal in accordance with an embodiment.
Figure 7:
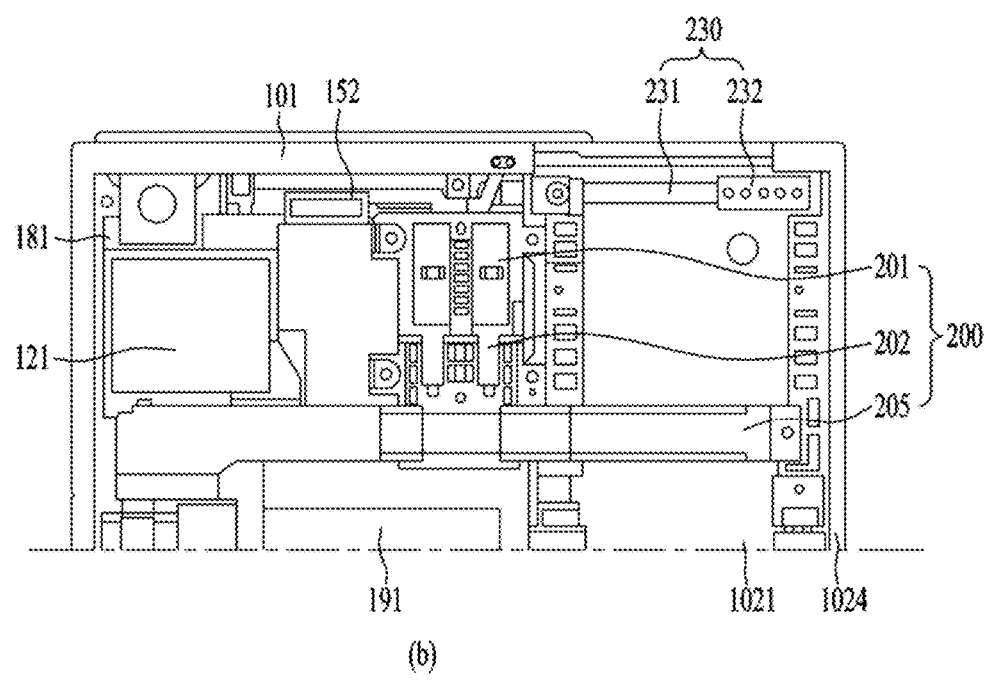

FIG. 7 is a view showing a driving unit 200 of the mobile terminal 100 in accordance with an embodiment. FIG. 7(a) illustrates the first state and FIG. 7(b) illustrates the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
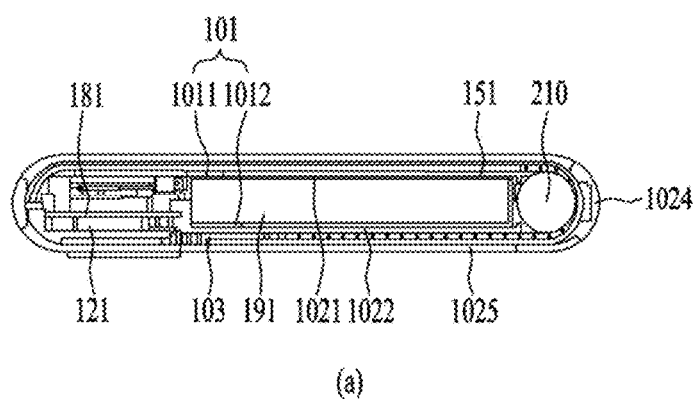
FIG. 8 is a cross-sectional view taken along lines A-A and B-B in FIG. 2.
Figure 8:
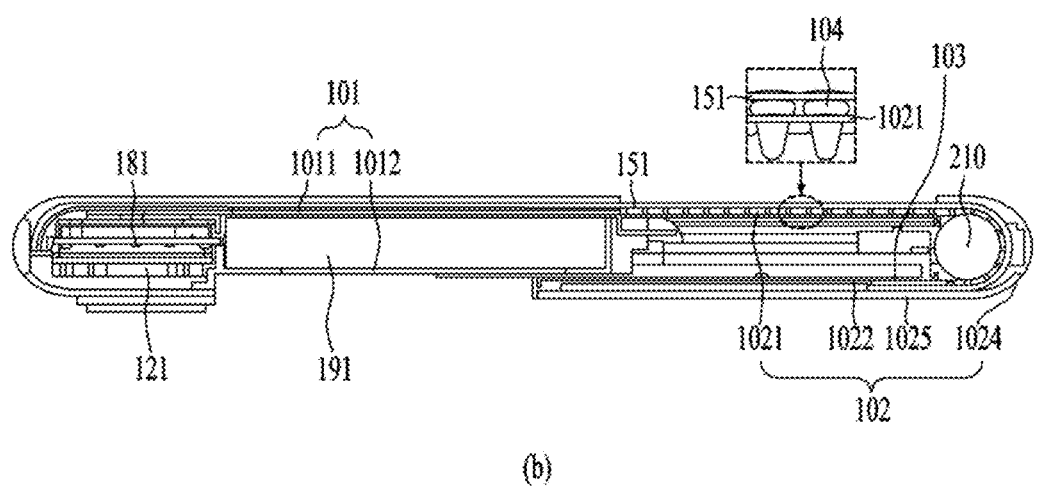

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(b), when switch to the second state occurs, the rolling plate 104 may move to the front and the rolling plate 104 may be positioned on the front portion of the second frame 102.

The third region 151c of the display unit 151 in which the rolling plate 104 is positioned is a portion where bending deformation occurs when switch from the first state to the second state occurs. Accordingly, the rolling plate 104 may be deformed according to deformation of the third region 151c. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
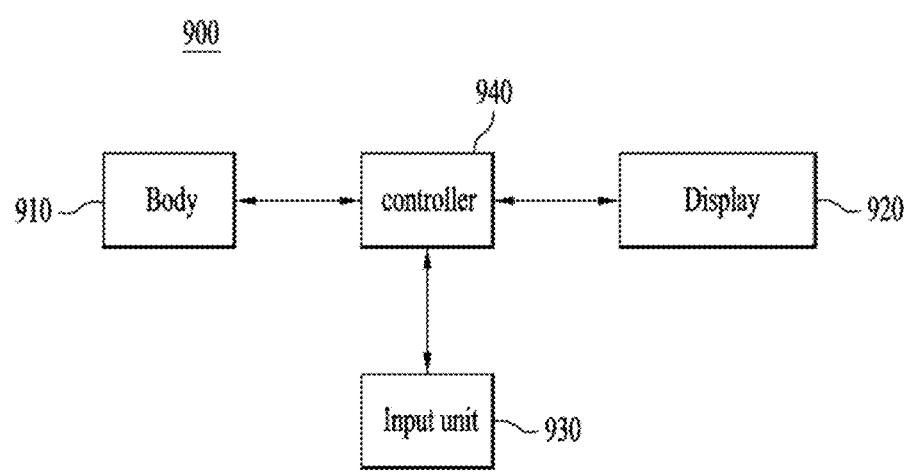
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, and a controller 940.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

The mobile terminal 900 may further include a driving unit (not illustrated) for causing the second frame to be extended or contracted. Here, the driving unit may be implemented as the driving unit 200 of FIG. 7.

The mobile terminal 900 may operate in an enlarged display mode as the second frame is extended, and may operate in a reduced display mode as the second frame is contracted. The enlarged display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

As the second frame is contracted, the display portion positioned on the front of the body 910 may move to the side of the body 910 or to the rear of the body 910 via the side of the body 910.

In an embodiment of the present disclosure, a state in which the second frame is not extended, i.e., a state in which the mobile terminal 900 is in the reduced display mode, may be defined as a default state. In addition, a state in which the mobile terminal is in the reduced display mode may be referred to as a first mode and a state in which the mobile terminal is in the enlarged display mode may be referred to as a second mode.

The display 920 may display visual information. The visual information may include text, indicators, icons, content, applications, images, and videos. The display 920 may output visual information on a screen based on a control command of the controller 940.

The display 920 may split a region in an enlarged display mode. More specifically, the display may output different pieces of information in split regions. For example, the display 920 may output a first application in a first region, a second application in a second region, and a third application in a third region.

The display 920 may output a visual effect. More specifically, the display 920 may assign an effect to output visual information rather than simply outputting visual information. For example, the display 920 may perform black and white processing, blur processing, or dimming process upon output applications. The display 920 may output the visual effect only in a partial region.

Although the display 920 may have an inter-layered structure or an integrated structure with a touch sensor as illustrated with reference to FIG. 1, so that the display 920 may be implemented with a touch screen, an output function and a touch function may be individually controlled. This will be described hereinbelow with reference to the drawings.

The input unit 930 may receive various inputs for the mobile terminal 900 from the user and transmit an input result so that the controller 940 may perform operations corresponding to the received inputs. For example, the input unit 930 may receive an input signal of touching a first region from a user and transfer an input result to the controller 940 so that the controller 940 may determine that the user has selected the first region.

In an embodiment of the present disclosure, the input unit 930 may be provided on the display 920 and may be implemented as a touch screen. Although the input unit 930 may be included in the display 920, a touch function may be controlled separately from an output function of the display 920. The input unit 930 may be implemented as the input unit 120 of FIG. 1.

The input unit 930 may detect touch input from the user. In this case, the input unit 930 may detect a point at which the touch input is detected, a touched region, touched pressure, etc.

The input unit 930 may receive an input signal of simply touching an icon or an image from the user. Alternatively, the input unit 930 may receive a touch drag input signal of touching an icon or an image and then dragging the icon or image up to another position.

A communication unit (not shown) may externally perform communication. The communication unit may transmit and receive information (data) to or from an external device through various communication techniques. In an embodiment of the present disclosure, the communication device may receive an event generated from an external server or an external device. For example, the communication unit may receive a telephone call or a text message. Similarly, the communication unit may transmit the event to the external server or the external device. The communication unit may be implemented by the wireless communication unit 110 of FIG. 1.

The controller 940 may process data, control the units of the mobile terminal 900 described above, and control data transmission/reception between the units. In the present disclosure, the controller 940 may be implemented as the controller 180 of FIG. 1.

The operations performed by the mobile terminal 900 may be controlled by the controller 940. However, in the drawings and the following description, these operations will be collectively described, for convenience, as being performed/controlled by the mobile terminal 900.

Hereinafter, embodiments of the present disclosure will be described with reference to FIGS. 10 to 19. In describing and understanding the embodiments of the present disclosure, reference may be made to the above description given with reference to FIGS. 1 to 9.

Figure 10:
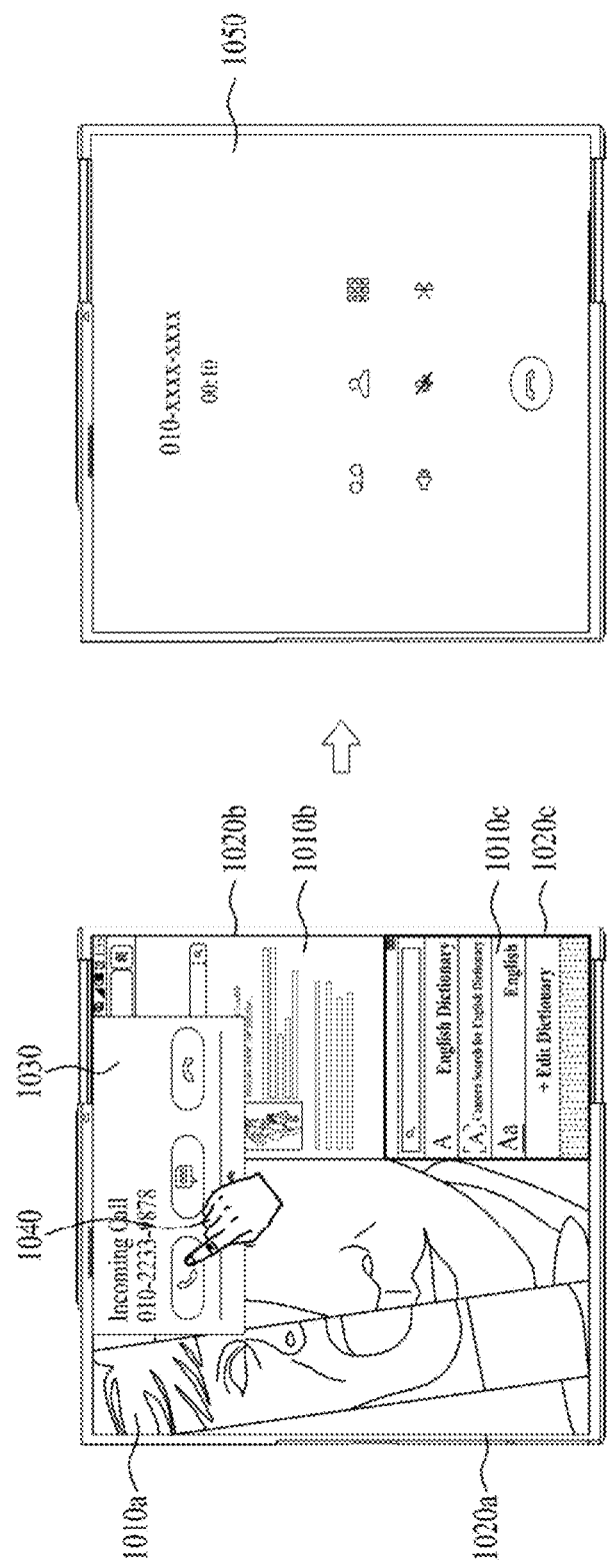
FIG. 10 is a diagram illustrating problems of the prior art before a description of an embodiment of the present disclosure is given.

FIG. 10 is a diagram illustrating problems of the prior art before a description of an embodiment of the present disclosure is given.

Referring to the left drawing of FIG. 10, the mobile terminal may output at least one application in a display region. In this case, the mobile terminal may output at least one application in a split region. For example, the mobile terminal may output a first application 1010*a* in a first region 1020*a*, a second application 1010*b* in a second region 1020*b*, and a third application 1010*c* in a third region 1020*c*.

The mobile terminal may receive an event which is generated while the first application 1010*a* to the third application 1010*c* are output in the display region. In this case, the mobile terminal may output an event generation window 1030 corresponding to the received event.

The mobile terminal may receive a first signal 1040 for selecting the event generation window 1030. For example, the mobile terminal may receive a touch input signal generated when a user touches the event generation window 1030.

Referring to the right drawing of FIG. 10, the mobile terminal may output an application 1050 corresponding to the event according to the first signal 1040. In this case, the mobile terminal may output the application 1050 corresponding to the event on a full screen according to the first signal 1040.

That is, in the related art, since the size of the display is adapted to output one application, there is no problem in outputting the application 1050 corresponding to the event on the full screen.

However, with the development of a flexible display, the mobile terminal may variably provide the display in an enlarged display mode and a reduced display mode.

Accordingly, when the mobile terminal outputs the application 1050 corresponding to the event according to the reception of the event, various embodiments may be considered in addition to the method of simply outputting the application 1050 on the entire screen.

Hereinafter, embodiments in which the mobile terminal outputs a new application in the enlarged display mode will be described with reference to FIGS. 11A to 16 and embodiments in which the mobile terminal outputs a new application in the reduced display mode will be described with reference to FIGS. 17A to 17D.

Figure 11A:
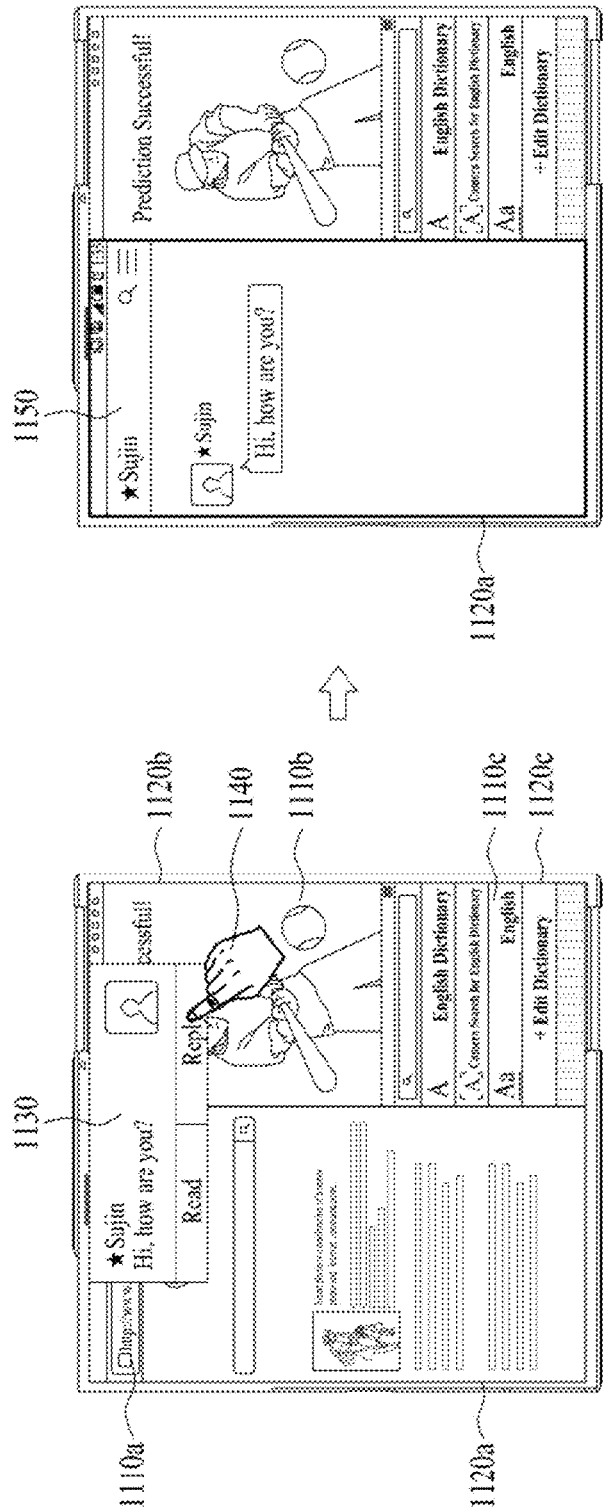
Figure 11B:
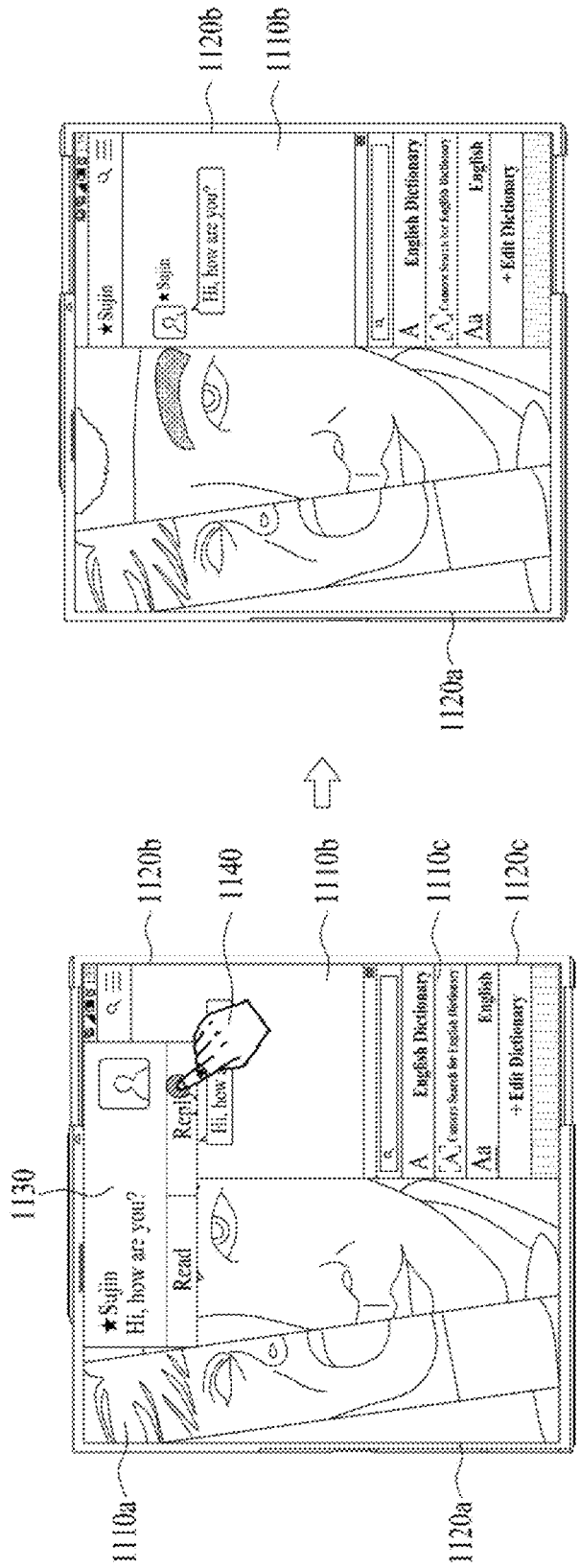

FIGS. 11A to 11C are diagrams illustrating embodiments of outputting an application corresponding to an event in an enlarged display mode in a mobile terminal according to an embodiment of the present disclosure.

In an embodiment of the present disclosure, the mobile terminal may output at least one application on a display in the enlarged display mode. For example, the mobile terminal may output three applications in the enlarged display mode. The mobile terminal may output a first application 1110*a* in a first region 1120*a*, a second application 1110*b* in a second region 1120*b*, and a third application 1110*c* in a third region 1120*c*.

Upon receiving an event, the mobile terminal may output an application corresponding to the event in the first region based on a signal for confirming the event.

In this case, when a preset application is not being output in the enlarged display mode, the first region may be a main region of the enlarged display mode. This embodiment will be described with reference to FIG. 11A.

On the other hand, when the preset application is being output in the enlarged display mode, the first region may be an event application region. This embodiment will be described with reference to FIGS. 11B and 11C.

The preset application may be a video playback application. Thereby, when the video playback application is being output on the display, the user who views video may not be disturbed even if the application corresponding to the event is executed.

While a description will be given and an assumption will be made hereinbelow based on the video playback application as the preset application, the preset application may be another application. The video playback application may be designated as the preset application by default in the mobile terminal or another application may be designated as the preset application according to user setting.

FIG. 11A illustrates an embodiment of controlling output of an application corresponding to an event in a main region when a mobile terminal according to an embodiment of the present disclosure receives the event while the preset application is not being output.

Referring to the left drawing of FIG. 11A, the mobile terminal may receive an event while outputting the first application 1110*a* in the first region 1120*a*, the second application 1110*b* in the second region 1120*b*, and the third application 1110*c* in the third region 1120*c*.

For example, the first application 1110*a* may correspond to a web browser application, the second application 1110*b* may correspond to a game application, the third application 1110*c* may correspond to a dictionary application, and the event may correspond to a message.

In an embodiment of the present disclosure, the mobile terminal may output an event generation window 1130 corresponding to the received event. In this case, the mobile terminal may output a pop-up window as the event generation window 1130. For example, the mobile terminal may output the event generation window 1130 indicating that an SMS message is being received in an overlay manner.

The mobile terminal may receive a first signal 1140 for selecting the event generation window 1130. In the above-described example, the mobile terminal may receive a touch input signal of the user for selecting the event generation window 1130 indicating that an SMS message is being received. For example, the user may touch "reply" in the event generation window 1130 indicating that the SMS message is being received.

Referring to the right drawing of FIG. 11A, upon receiving the first signal 1140, the mobile terminal may control output of an application 1150 corresponding to the event in a main region 1120*a*. Here, the main region 1120*a* may correspond to a region in which an application is output in the largest size in the enlarged display mode.

For example, when the mobile terminal outputs applications in the first region 1120*a*, the second region 1120*b*, and the third region 1120*c* in the enlarged display mode, a region with the largest size among the three regions may be the main region. Accordingly, in the embodiment of FIG. 11A, the main region 1120a may be the first region 1120a.

When the mobile terminal receives the first signal 1140 while the preset application is not being output in the enlarged display mode, the mobile terminal may output the application 1150 corresponding to the event in the main region 1120a.

That is, if the preset application is a video playback application, in the embodiment of FIG. 11A, the mobile terminal is in a state in which the video playback application is not being output. In this case, if the user inputs the first signal 1140 for selecting the event generation window 1130, the mobile terminal may control output of the application 1150 corresponding to the event in the largest region 1120a. This is because, when the preset application is not being output, the mobile terminal may determine that the user expects to output the application 1150 corresponding to the event in the largest size. Accordingly, the mobile terminal may output the application 1150 corresponding to the event in the main region 1120a.

Although not illustrated in the drawing, the mobile terminal may output the application 1150 corresponding to the event in the first region 1120a, which is the main region 1120a, and at the same time, change the applications output in the second region 1120b and the third region 1120c. For example, upon outputting the application 1150 corresponding to the event in the first region 1120a, the mobile terminal may output two applications having higher priorities among the first application 1110a to the third application 1110c in the second region 1120b and the third region 1120c, based on priorities of the first application 1110a, the second application 1110b, and the third application 1110c.

FIG. 11B illustrates an embodiment of controlling output of an application corresponding to an event to in an event application region when a mobile terminal according to an embodiment of the present disclosure receives the event while the preset application is being output. Hereinafter, the embodiment of FIG. 11B may refer to the description of FIG. 11A.

Referring to the left drawing of FIG. 11B, the mobile terminal may receive the event while outputting the first application 1110a in the first region 1120a, the second application 1110b in the second region 1120b, and the third application 1110c in the third region 1120c.

However, unlike the embodiment of FIG. 11A, the first application 1110a may correspond to a video playback application, the second application 1110b may correspond to a message application, the third application 1110c may correspond to a dictionary application, and the event may correspond to a message. Accordingly, the embodiment of FIG. 11B may correspond to a state in which an application corresponding to the received event is currently being output.

That is, the embodiment of FIG. 11B illustrates an output position of the application corresponding to the event when the mobile terminal receives the event in a state in which the preset application is being output in the enlarged display mode and the application corresponding to the event is currently being output.

The mobile terminal may output the event generation window 1130 corresponding to the received event and receive the first signal 1140 for selecting the event generation window 1130.

More specifically, the mobile terminal may receive the first signal 1140 in a state in which the preset application 1110a is being executed in the first region 1120a and the second application 1110b, which is an application corresponding to the event, is being executed in the second region 1120b.

Referring to the right drawing of FIG. 11B, upon receiving the first signal 1140, the mobile terminal may control output of content corresponding to the event over the second application 1110b.

Accordingly, the mobile terminal may output the content corresponding to the event over the second application 1110b which is being output in the second region 1120b in a state in which the preset application 1110a is output in the main region 1120a.

That is, the mobile terminal may output the content corresponding to the event in the second region 1120b in which an application related to the received event is being executed, without hindering the preset application 1110a from being output.

Finally, an output position of an application corresponding to an event when a preset application is being output in the enlarged display mode and when the event is received in a state in which an application related to the received event is not being output will now be described with reference to FIG. 11C.

FIG. 11C is a diagram illustrating an embodiment of controlling output of an application corresponding to an event in an event application region when a mobile terminal according to an embodiment of the present disclosure receives the event while the preset application is being output. Hereinafter, the embodiment of FIG. 11C may refer to the description of FIGS. 11A and 11B.

Referring to the left drawing of FIG. 11C, the mobile terminal may receive the event while outputting the first application 1110a in the first region 1120a, the second application 1110b in the second region 1120b, and the third application 1110c in the third region 1120c.

However, unlike the embodiments of FIGS. 11A and 11B, the first application 1110a may correspond to a video playback application, the second application 1110b may correspond to a web browser application, the third application 1110c may correspond to a dictionary application, and the event may correspond to a message.

That is, the embodiment of FIG. 11C may correspond to a state in which the preset application is being output and an application corresponding to the received event is not being output.

The mobile terminal may output the event generation window 1130 corresponding to the received event while the preset application 1110a is being executed in the first region 1120a and receive the first signal 1140 for selecting the event generation window 1130.

Referring to the right drawing of FIG. 11C, upon receiving the first signal 1140, the mobile terminal may control output of an application 1150 corresponding to the event in the event application region.

In this case, unlike FIG. 11B, the event application region may correspond to a region with a history in which the application corresponding to the event has been executed in the past. That is, when there is a history in which the application corresponding to the event has been executed in the second region 1120b, the mobile terminal may output the application 1150 corresponding to the event in the second region 1120b. For example, when there is a history in which a message application has been executed in the second region 1120b, the mobile terminal may output the message application 1150, which is the application corresponding to the event, in the second region 1120b.

In an embodiment of the present disclosure, the mobile terminal may store a history of applications that have been executed in a split region. Accordingly, even if the application 1150 corresponding to the event is not being currently executed, the mobile terminal may control output of the application 1150 corresponding to the event in the event application region 1120b based on the history.

In the above-described example, when the message application related to the event (message) is not being output in the remaining regions except for the region of the video playback application in a state in which the video playback application is being output, the mobile terminal may output the message application in the second region 1120b with a history in which the message application has been output in the past.

Although not shown in the drawing, if there is no history in which the application related to the event has been executed in the remaining region (e.g., the second region 1120b or the third region 1120c) except for the region of the preset application 1110a (e.g., the first region 1120a) when the mobile terminal receives the event while the preset application 1110a is being executed, the mobile terminal may output the application 1150 corresponding to the event in the second region 1120b or the third region 1120c. In this case, the mobile terminal may compare priority of the second application 1110b output in the second region 1120b with priority of the third application 1110c output in the third region 1120c and output the application 1150 corresponding to the event in a region in which an application having a lower priority is output.

FIGS. 12A to 12D are diagrams illustrating embodiments of outputting an application corresponding to an event based on selection of a user in an enlarged display mode in a mobile terminal according to an embodiment of the present disclosure.

In an embodiment of the present disclosure, the mobile terminal may output at least one application on a display in the enlarged display mode. For example, the mobile terminal may output three applications in the enlarged display mode. The mobile terminal may output a first application 1210a in a first region 1220a, a second application 1210b in a second region 1220b, and a third application 1210c in a third region 1220c.

The mobile terminal may control output of an event generation window 1230 corresponding to a received event and output of an application corresponding to the event based on a signal for selecting the event generation window 1230.

Embodiments of outputting the application corresponding to the event in different regions according to a first signal will now be described with reference to FIGS. 12A to 12D.

Figure 12A:
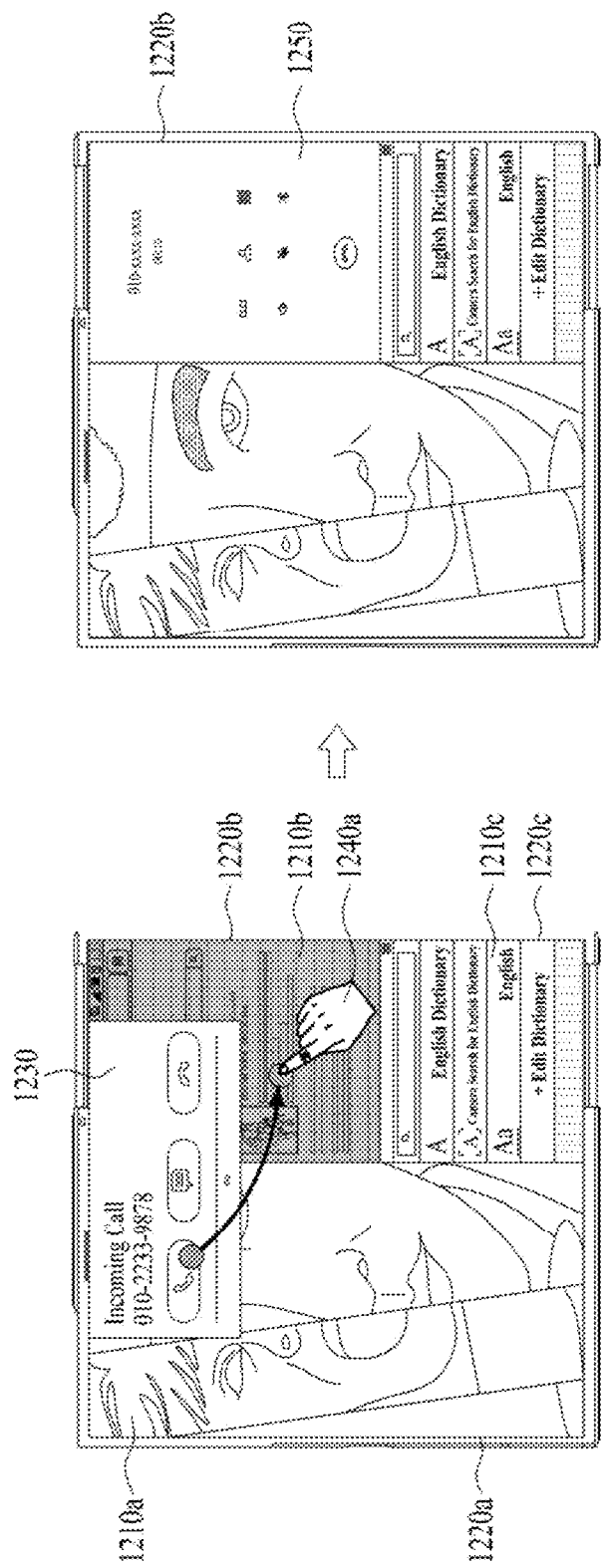
FIGS. 12A to 12D are diagrams illustrating embodiments of outputting an application corresponding to an event based on selection of a user in an enlarged display mode in a mobile terminal according to an embodiment of the present disclosure.

FIG. 12A is a diagram illustrating an embodiment in which the mobile terminal receives, as the first signal, a first touch input signal 1240a for selecting the event generation window 1230 and then dragging the event generation window 1230 to the second region 1220b.

Referring to the left drawing of FIG. 12A, the mobile terminal receives the first touch input signal 1240a for selecting the event generation window 1230 and then dragging the event generation window 1230 to the second region 1220b.

For example, if the event is a phone call, the mobile terminal may receive the phone call and output the event generation window 1230 for the received call. In this case, the event generation window 1230 may further include icons such as "Accept", "Message", and "Decline".

More specifically, the mobile terminal may receive the first touch input signal 1240a for touching the "Accept" icon included in the event generation window 1230 and then dragging the "Accept" icon to the second region 1220b.

In an embodiment of the present disclosure, when the user touches an icon included in the event generation window 1230 and then drags the icon to the second region 1220b, the mobile terminal may distinguishably indicate the second region 1220b. For example, when the event generation window 1230 is dragged to the second region 1220b through the first touch input signal 1240a, the mobile terminal may display the second region 1220b in black and white or in a preset color. In particular, the mobile terminal may distinguishably indicate the second region 1220b for a time until touch of the first touch input signal 1240a is released in the second region 1220b after an icon included in the event generation window 1230 is touched and then dragged to the second region 1220b through the first touch input signal 1240a.

Referring to the right drawing of FIG. 12A, upon receiving the first touch input signal 1240a, the mobile terminal may output an application 1250 corresponding to the event in the second region 1220b.

More specifically, if touch of the first touch input signal 1240a is released in the second region 1220b after the event generation window 1230 is dragged to the second region 1220b through the first touch input signal 1240a, the mobile terminal may output the application 1250 corresponding to the event in the second region 1220b.

Figure 12B:
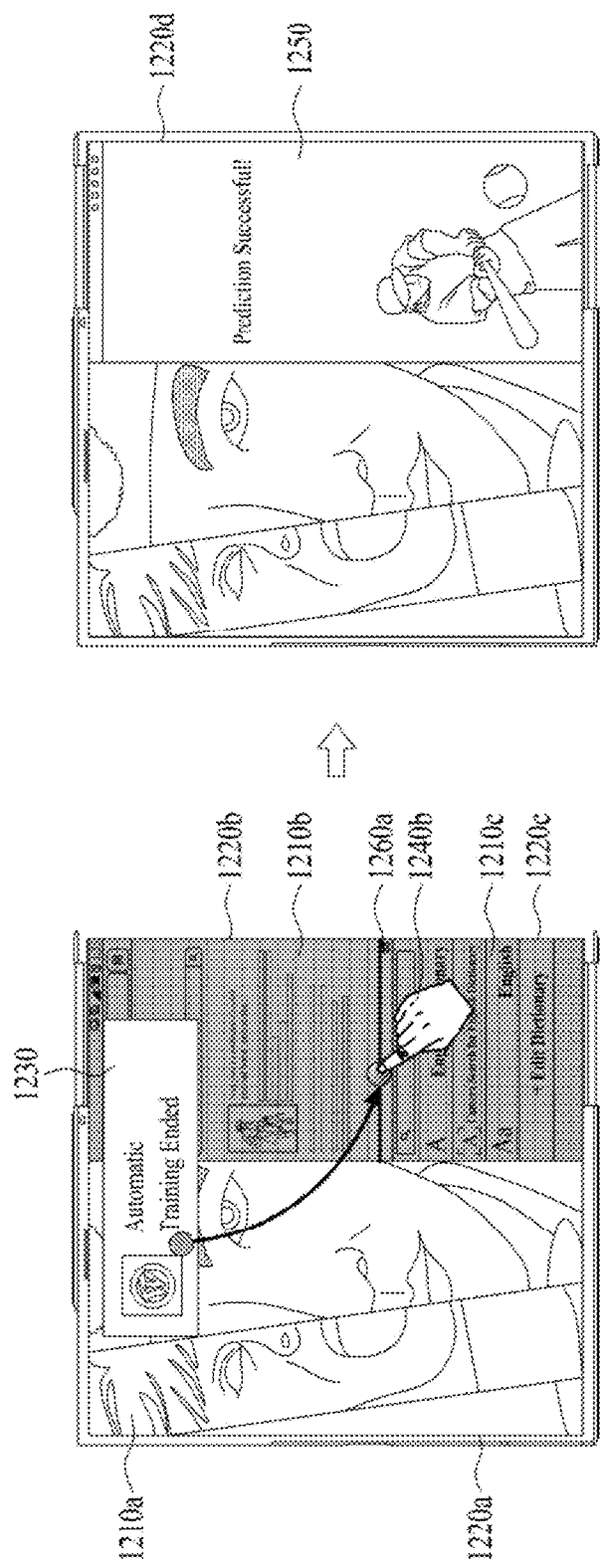

FIG. 12B is a diagram illustrating an embodiment in which the mobile terminal receives, as the first signal, a second touch input signal 1240b for selecting an event generation window 1230 and then dragging the event generation window 1230 to a first indicator 1260a. The embodiment of FIG. 12B may refer to the description of FIG. 12A.

Referring to the left drawing of FIG. 12B, the mobile terminal may receive the second touch input signal 1240b for selecting the event generation window 1230 and then dragging the event generation window 1230 to the first indicator 1260a. Here, the first indicator 1260a may correspond to an indicator indicated as a line for distinguishing between the second region 1220b and the third region 1220c. In this case, the first indicator 1260a may be an edge line distinguished by a second application 1210b output in the second region 1220b and a third application 1210c output in the third region 1220c, as well as the indicator indicated clearly as the line for distinguishing between the second region 1220b and the third region 1220c.

For example, when the event is an alarm of a game application, the mobile terminal may receive the alarm of the game application and output the event generation window 1230 for the received alarm.

In an embodiment of the present disclosure, if the user touches the event generation window 1230 and drags the event generation window to the first indicator 1260a, the mobile terminal may distinguishably indicate the second region 1220b and the third region 1220c. That is, the mobile terminal may distinguishably indicate a region in which an application corresponding to the event is to be output.

Referring to the right drawing of FIG. 12B, upon receiving the second touch input signal 1240b, the mobile terminal may output the application 1250 corresponding to the event in a fourth region 1220d. Here, the fourth region 1220d may correspond to a region in which the second region 1220b and the third region 1220c are merged.

More specifically, since the second touch input signal 1240b corresponds to an input signal for dragging the event generation window 1230 to the first indicator 1260*a* for distinguishing between the second region 1220*b* and the third region 1220*c*, the mobile terminal may output the application 1250 corresponding to the event in the fourth region 1220*d* based on the second touch input signal 1240*b*. That is, since the first indicator 1260*a* corresponds to an indicator that distinguishes between the second region 1220*b* and the third region 1220*c*, the mobile terminal may understand that the user intends to output the application 1250 corresponding to the event in the fourth region 1220*d* in which the second region 1220*b* and the third region 1220*c* are merged, through the second touch input signal 1240*b* for dragging the event generation window 1230 to the first indicator 1260*a*.

In the above-described example, if the event is the alarm of the game application, the mobile terminal may output the game application in the fourth region 1220*d* when touch of the second touch input signal 1240*b* is released on the first indicator 1260*a*.

Figure 12C:
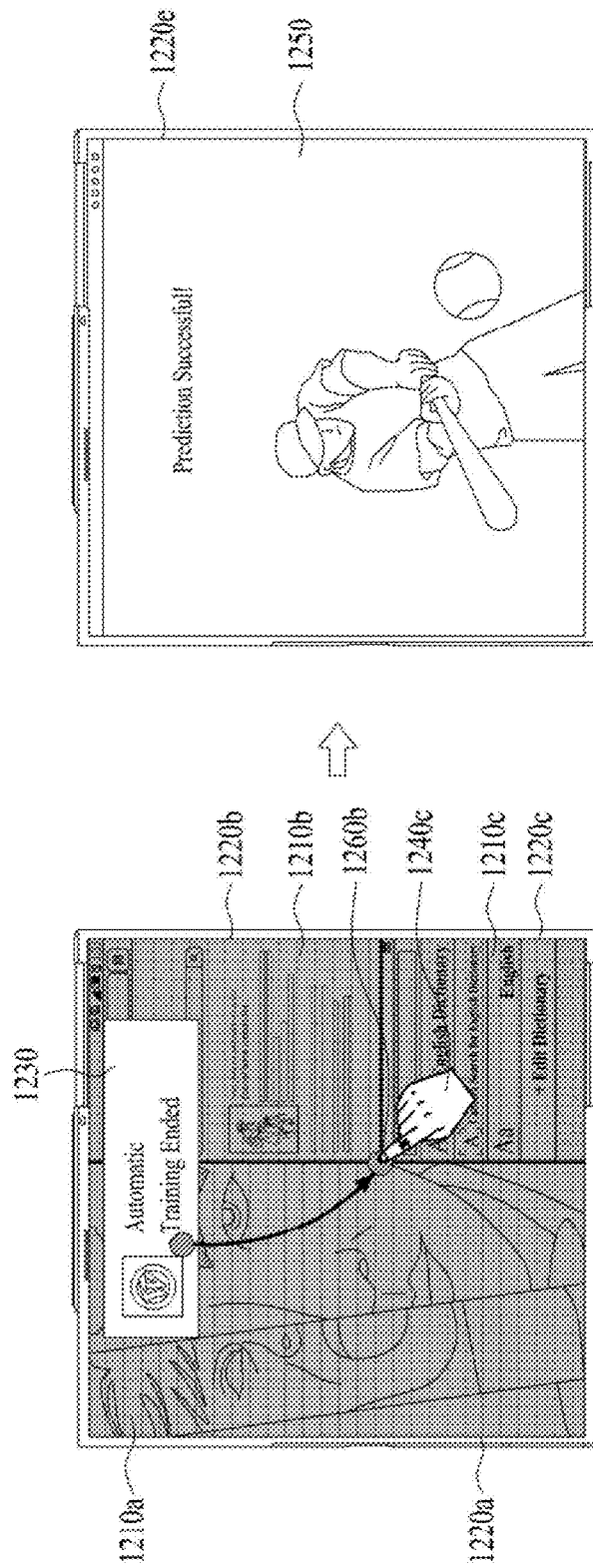

FIG. 12C is a diagram illustrating an embodiment in which the mobile terminal receives, as the first signal, a third touch input signal 1240*c* for selecting the event generation window 1230 and then dragging the event generation window 1230 to a second indicator 1260*b*. The embodiment of FIG. 12C may refer to the description of FIGS. 12A and 12B.

Referring to the left drawing of FIG. 12C, the mobile terminal may receive the third touch input signal 1240*c* for selecting the event generation window 1230 and then dragging the event generation window 1230 to the second indicator 1260*b*. Here, the second indicator 1260*b* may correspond to an indicator indicated as a line for distinguishing between the first region 1220*a*, the second region 1220*b*, and the third region 1220*c*. In this case, the first indicator 1260*a* may indicate an edge line distinguished by the first application 1210*a* output in the first region 1220*a*, the second application 1210*b* output in the second region 1220*b*, and the third application output in the third region 1220*c*, as well as the indicator indicated clearly as the line for distinguishing between the first region 1220*a*, the second region 1220*b*, and the third region 1220*c*.

In the above-described example, when the event is the alarm of the game application, the mobile terminal may receive the alarm of the game application and output the event generation window 1230 for the received alarm.

In an embodiment of the present disclosure, if the user touches the event generation window 1230 and drags the event generation window 1230 to the second indicator 1260*b*, the mobile terminal may distinguishably indicate the first region 1220*a*, the second region 1220*b*, and the third region 1220*c*. That is, the mobile terminal may distinguishably indicate a region in which an application corresponding to the event is to be output.

Referring to the right drawing of FIG. 12C, upon receiving the third touch input signal 1240*c*, the mobile terminal may output the application 1250 corresponding to the event in a fifth region 1220*e*. Here, the fifth region 1220*e* may correspond to a region in which the first region 1220*a*, the second region 1220*b*, and the third region 1220*c* are merged.

More specifically, since the third touch input signal 1240*c* corresponds to an input signal for dragging the event generation window 1230 to the second indicator 1260*b* that distinguishes between the first region 1220*a*, the second region 1220*b*, and the third region 1220*c*, the mobile terminal may output the application 1250 corresponding to the event in the fifth region 1220*e* based on the third touch input signal 1240*c*. That is, since the second indicator 1260*b* corresponds to an indicator that distinguishes between the first region 1220*a*, the second region 1220*b*, and the third region 1220*c*, the mobile terminal may understand that the user intends to output the application 1250 corresponding to the event in the fifth region 1220*e* in which the first region 1220*a*, the second region 1220*b*, and the third region 1220*c* are merged, through the third touch input signal 1240*c* for dragging the event generation window 1230 to the second indicator 1260*b*.

In the above-described example, if the event is the alarm of the game application, the mobile terminal may output the game application in the fifth region 1220*d* when touch of the third touch input signal 1240*c* is released in the second indicator 1260*b*.

That is, referring to FIGS. 12A to 12C, when multiple applications are being output in split regions in the enlarged display mode, the mobile terminal may output the application corresponding to the received event in a partial or full screen of the split regions based on a user input signal.

Figure 12D:
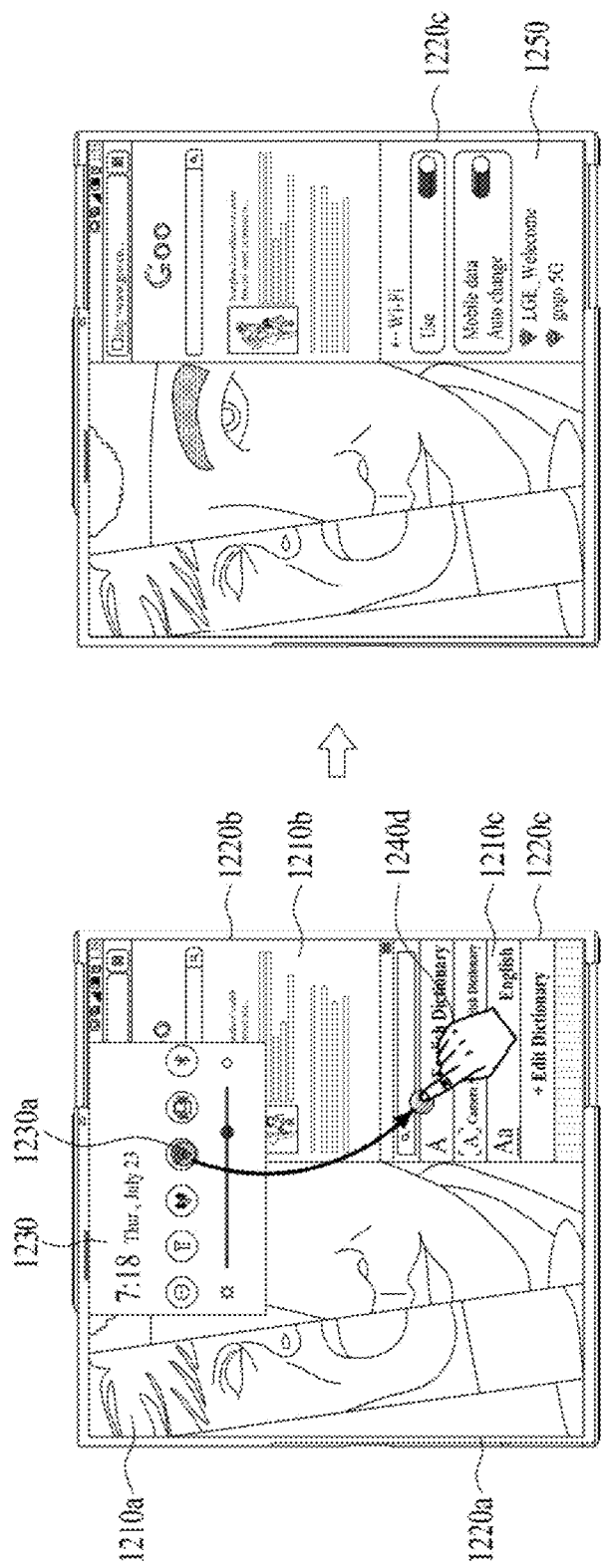

FIG. 12D is a diagram illustrating an embodiment in which the mobile terminal receives, as the first signal, a fourth touch input signal 1240*d* for selecting an item 1230*a* of a setting window 1230 and then dragging the item 1230*a* to the third region 1220*c*.

Referring to the left drawing of FIG. 12D, the mobile terminal may output the setting window 1230. Here, the setting window may include various items for controlling functions of the mobile terminal. For example, the setting window may include a brightness control item for adjusting the brightness of the display, a flashlight activation item for turning on/off a flashlight function, a Bluetooth activation item for activating a Bluetooth function, a Wi-Fi setting item, and the like. The setting window may be output by user input.

In an embodiment of the present disclosure, the mobile terminal may receive the fourth touch input signal 1240*d* for touching the item 1230*a* included in the setting window 1230 and then dragging the item 1230*a* to the third region 1220*c*.

Referring to the right drawing of FIG. 12D, upon receiving the fourth touch input signal 1240*d*, the mobile terminal may output an application 1250 corresponding to the item 1230*a* in the third region 1220*c*.

That is, similar to the embodiment of outputting the application corresponding to the received event in the split region, the mobile terminal may output the application 1250 corresponding to the item 1230*a* in the split region.

Figure 13:
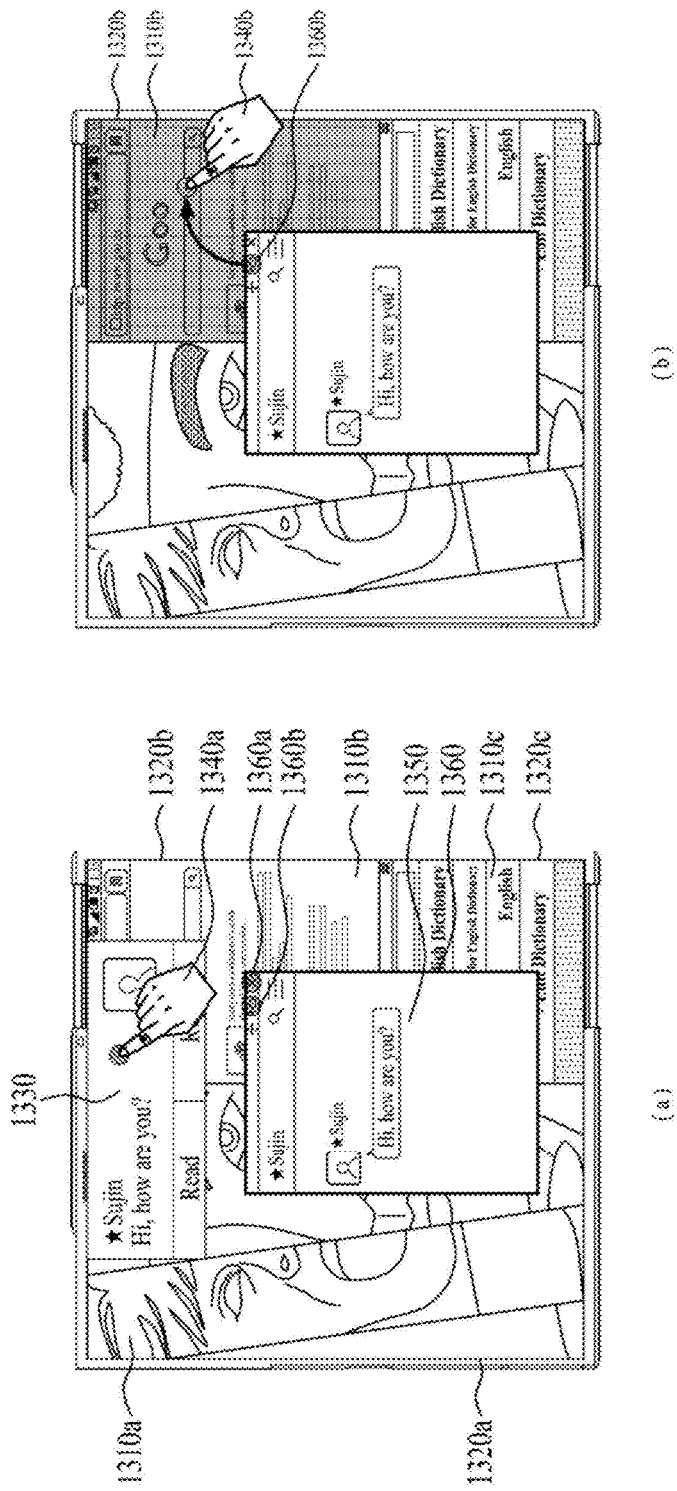
FIG. 13 is a diagram illustrating an embodiment of outputting an application pop-up window corresponding to an event in a mobile terminal according to an embodiment of the present disclosure.

FIG. 13 is a diagram illustrating an embodiment of outputting an application pop-up window corresponding to an event in a mobile terminal according to an embodiment of the present disclosure.

Referring to FIG. 13(*a*), the mobile terminal may receive an event while outputting a first application 1310*a* in a first region 1320*a*, a second application 1310*b* in a second region 1320*b*, and a third application 1310*c* in a third region 1320*c*.

In an embodiment of the present disclosure, the mobile terminal may control output of an application 1350 corresponding to the event in a pop-up window 1360 based on a first signal 1340*a* for selecting an event generation window 1330. In this case, the first signal 1340*a* may correspond to a preset input signal. For example, the mobile terminal may receive the first signal 1340*a* for touching the event generation window 1330 for a preset time or more.

Upon outputting the application 1350 corresponding to the event in the pop-up window 1360, the mobile terminal may further output a pop-up window end indicator 1360*a* and a split screen output indicator 1360*b* in the pop-up window 1360. Here, the pop-up window end indicator 1360*a* may represent an indicator for ending the pop-up window 1360 and the split screen output indicator 1360*b* may represent an indicator for outputting, on a split screen, the application 1350 corresponding to the event which is being output in the pop-up window 1360.

Accordingly, upon receiving a signal (not shown) for selecting the pop-up window end indicator 1360*a*, the mobile terminal may end the pop-up window which is being output.

Referring to FIG. 13(*b*), the mobile terminal may receive a second signal 1340*b* for selecting the split screen output indicator 1360*b* included in the pop-up window 1360. Here, the second signal 1340*b* may correspond to a touch input signal for touching the split screen output indicator 1360*b* and then dragging the split screen output indicator 1360*b* to a second region 1320*b*.

In other words, the mobile terminal may determine a position at which an application corresponding to the pop-up window 1360 is output based on the signal for touching and then dragging the split screen output indicator 1360*b* included in the pop-up window 1360. That is, the above-described embodiments of FIGS. 12A to 12C may be applied to the embodiment of FIG. 13(*b*).

In an embodiment of the present disclosure, upon receiving the second signal 1340*b*, the mobile terminal may output the application 1350 corresponding to the event in the second region 1320*b*. As in the above-described embodiment, the mobile terminal may provide a visual effect to the second application 1310*b*, which has been output, until touch of the second signal 1340*b* is released in the second region 1320*b* after the split screen output indicator 1360*b* is touched and then dragged to the second region 1320*b*.

Figure 14A:
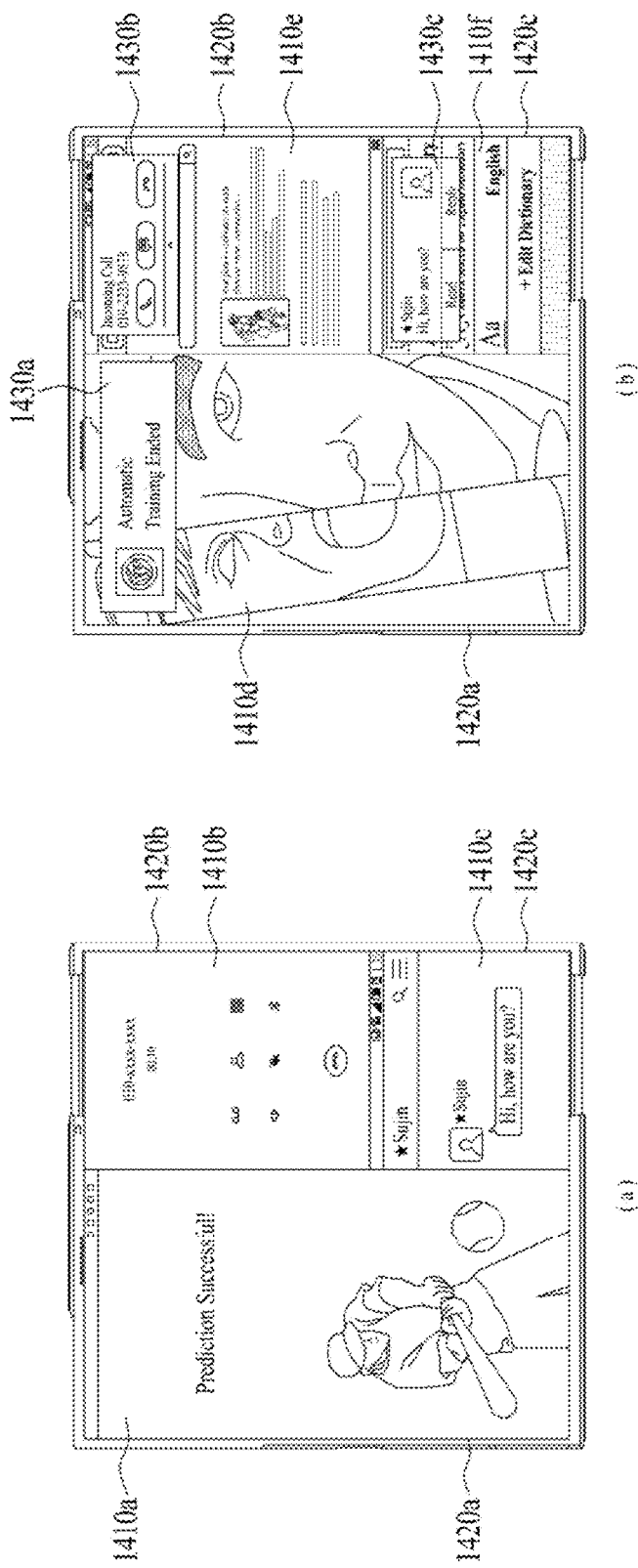
FIG. 14A is a diagram illustrating an embodiment of outputting an event generation window in a mobile terminal according to an embodiment of the present disclosure.

FIG. 14A is a diagram illustrating an embodiment of outputting an event generation window in a mobile terminal according to an embodiment of the present disclosure.

FIG. 14A(a) illustrates applications which are being output at a first time point and FIG. 14A(b) illustrates applications which are being output at a second time point. The second time point is later than the first time point.

Referring to FIG. 14A(a), the mobile terminal may output, at the first time point, a first application 1410*a* in a first region 1420*a*, a second application 1410*b* in a second region 1420*b*, and a third application 1410*c* in a third region 1420*c*.

Referring to FIG. 14A(b), the mobile terminal may output, at the second time point, a fourth application 1410*d* in the first region 1420*a*, a fifth application 1410*e* in the second region 1420*b*, and a sixth application 1410*f* in the third region 1420*c*. In this case, the fourth application 1410*d* to the sixth application 1410*f* may correspond to the same or different applications as or from the first application 1410*a* to the third application 1410*c*, respectively.

In addition, since the second time point is later than the first time point, the mobile terminal may output the fourth application 1410*d* after outputting the first application 1410*a* in the first region 1420*a*, output the fifth application 1410*e* after outputting the second application 1410*b* in the second region 1420*b*, and output the sixth 1410*f* after outputting the third application 1410*c* in the third region 1420*c*.

In an embodiment of the present disclosure, upon receiving an event and outputting an event generation window corresponding to the received event, the mobile terminal may output the event generation window in a region with a history in which the application corresponding to the event has been executed in the past.

More specifically, upon receiving an event corresponding to the first application 1410*a* at the second time point, the mobile terminal may output a first event generation window 1430*a* corresponding to the first application 1410*a* in the first region 1420*a*.

That is, upon receiving the event corresponding to the first application 1410*a* in a state in which the fourth application 1410*d* is being output in the first region 1420*a*, the fifth application 1410*e* is being output in the second region 1420*b*, and the sixth application 1410*e* is being output in the third region 1420*c*. the mobile terminal may output the first event generation window 1430*a* corresponding to the first application in the first region 1420*a*. This is because a history in which the first application 1410*a* has been executed at the first time point earlier than the second time point is present in the first region 1420*a*.

Similarly, upon receiving an event corresponding to the second application 1410*b* at the second time point, the mobile terminal may output a second event generation window 1430*b* corresponding to the second application 1410*b* in the second region 1420*b*.

In addition, upon receiving an event corresponding to the third application 1410*c* at the second time point, the mobile terminal may output a third event generation window 1430*c* corresponding to the third application 1410*c* in the third region 1420*c*.

Although FIG. 14A(b) illustrates that the first event generation window 1430*a*, the second event generation window 1430*b*, and the third event generation window 1430*c* are all simultaneously output, it is apparent that the mobile terminal is capable of receiving each event at any time. However, when receiving an event corresponding to an application that has been executed in the past, the mobile terminal may output an event generation window based on the location of the application that has been output.

Figure 14B:
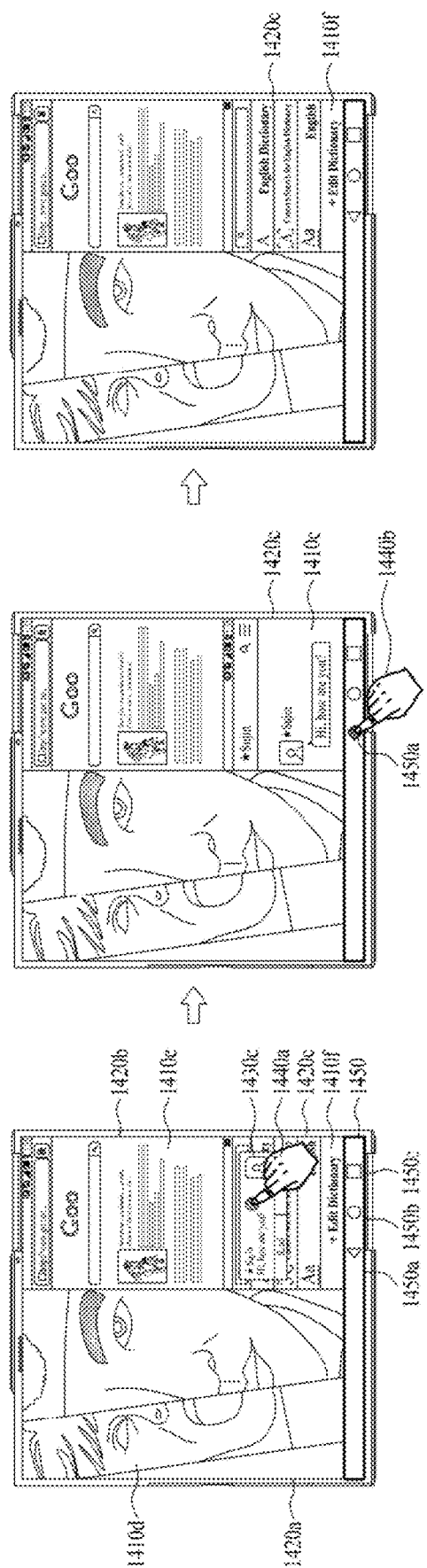
FIG. 14B is a diagram illustrating an embodiment of outputting an application corresponding to an event in a mobile terminal according to an embodiment of the present disclosure and then returning to an original application.

FIG. 14B is a diagram illustrating an embodiment of outputting an application corresponding to an event in a mobile terminal according to an embodiment of the present disclosure and then returning to an original application. The embodiment of FIG. 14B may refer to the description of FIG. 14A.

The first drawing of FIG. 14B may correspond to FIG. 14A(b).

That is, referring to the first drawing of FIG. 14B, the mobile terminal may output, at the second time point, the fourth application 1410*d* in the first region 1420*a*, the fifth application 1410*e* in the second region 1420*b*, and the sixth application 1410*f* in the third region 1420*c*.

In an embodiment of the present disclosure, the mobile terminal may output a navigation bar 1450 for controlling at least one application which is being output on the display in the enlarged display mode. The navigation bar 1450 may include a back button 1450*a*, a home button 1450*b*, and a recently used application list button 1450*c*. The back button 1450*a* corresponds to a button for outputting a previous screen of an application, the home button 1450*b* corresponds to a button for outputting a home screen, and the recently used application list button 1450*c* corresponds to a button for outputting a list of applications used for a preset time.

In an embodiment of the present disclosure, the mobile terminal may output the navigation bar 1450 in a preset region of the display. The output location of the navigation bar 1450 may be changed according to user setting and the navigation bar 1450 may be output in a lower region of the display by default.

Upon receiving an event corresponding to the third application 1410*c* at the second time point, the mobile terminal may output the third event generation window 1430c corresponding to the third application 1410c in the third region 1420c.

In an embodiment of the present disclosure, the mobile terminal may receive a first signal 1440a for selecting the third event generation window 1430c. For example, the user may touch the third event generation window 1430c.

Referring to the second drawing of FIG. 14B, upon receiving the first signal 1440a, the mobile terminal may output the third application 1410c corresponding to the third event generation window 1430c in the third region 1420c. That is, according to the embodiment of FIG. 14A, the mobile terminal may output the third application 1410c in the third region 1420c with a history in which the third application 1410c corresponding to the third event generation window 1430c has been executed.

In an embodiment of the present disclosure, the mobile terminal may receive a second signal 1440b for selecting the back button 1450a in a state in which the third application 1410c is output in the third region 1420c. For example, the second signal 1440b may correspond to a touch input signal of the user for touching the back button 1450a.

Referring to the third drawing of FIG. 14B, the mobile terminal may output the sixth application 1410f, which has been previously output, in the third region 1420c according to the second signal 1440b.

More specifically, the mobile terminal may output the sixth application 1410f in the third region according to the second signal 1440b for selecting the back button 1450a in a state in which the third application 1410c is being output in the third region 1420c. This is because the sixth application 1410f corresponds to an existing application which is being output in the third region 1420c at the first time point earlier than the second time point.

Accordingly, in a situation in which the user simultaneously uses a plurality of applications in the enlarged display mode, the user may quickly check an application corresponding to the received event in one split region and easily return to an existing application through the back button 1450a.

Unlike the above-described embodiment, the mobile terminal may output one application on a full screen in the enlarged display mode. An embodiment in which the mobile terminal outputs an application corresponding to an event in a state in which one application is being output on the full screen in the enlarged display mode will now be described.

Figure 15:
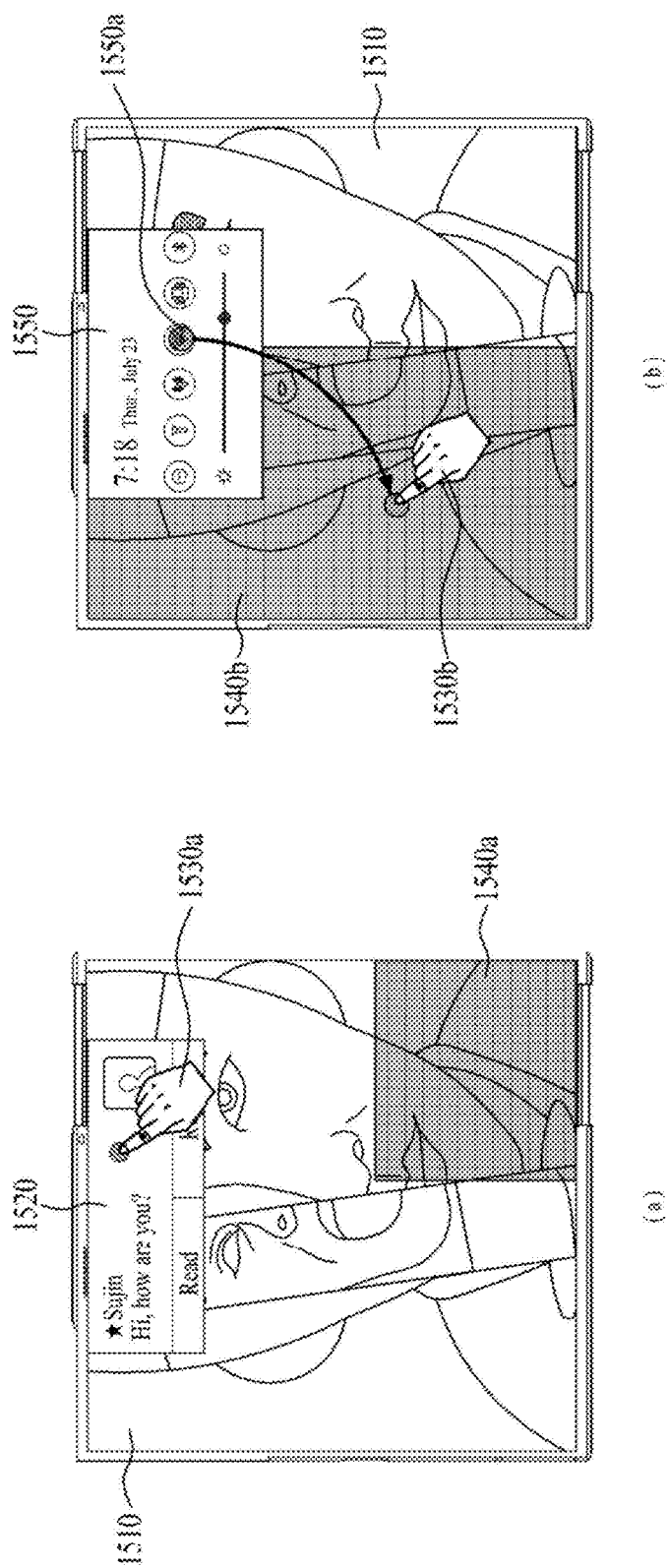
FIG. 15 is a diagram illustrating an embodiment indicating a region in which an application corresponding to an event is capable of being output in a mobile terminal according to an embodiment of the present disclosure.

FIG. 15 is a diagram illustrating an embodiment indicating a region in which an application corresponding to an event is capable of being output in a mobile terminal according to an embodiment of the present disclosure.

Upon receiving an event in a state in which one application is output on a full screen in the enlarged display mode, the mobile terminal may output a visual effect to indicate a region in which an application corresponding to the event is capable of being output, based on a signal for confirming the event.

More specifically, referring to FIG. 15(a), the mobile terminal may output a first application 1510 on the full screen in the enlarged display mode. The mobile terminal may receive an event while the first application 1510 is being output on the full screen and output an event generation window 1520 corresponding to the received event in a preset region.

In an embodiment of the present disclosure, the mobile terminal may receive a first signal 1530a for selecting the event generation window 1520. For example, the mobile terminal may receive a user input signal for touching the event generation window 1520 for a preset time or more.

Upon receiving the first signal 1530a, the mobile terminal may output a visual effect to indicate a first region 1540a in which an application (not shown) corresponding to the event is capable of being output. For example, the mobile terminal may output a color indicator to indicate the first region 1540a in which the application corresponding to the event is capable of being output.

In an embodiment of the present disclosure, the mobile terminal may determine the first region 1540a in which the application corresponding to the event is capable of being output in consideration of an aspect ratio and resolution of the application corresponding to the event.

Next, the mobile terminal may output a visual effect to indicate the first region 1540a in which the application corresponding to the event is capable of being output based on the first signal 1530a for selecting the event generation window 1520.

Accordingly, the user may check in advance where the application corresponding to the event generation window 1520 is output.

Referring to FIG. 15(b), the mobile terminal may output the first application 1510 on the full screen in the enlarged display mode. The mobile terminal may output a setting window 1550 while the first application 1510 is being output on the full screen. A description of the setting window 1550 may refer to the embodiment of FIG. 12D.

In an embodiment of the present disclosure, the mobile terminal may receive a second signal 1530b for selecting an item 1550a included in the setting window 1550. Here, the mobile terminal may receive a touch input signal for selecting the item 1550a and dragging the item 1550a to a second region 1540b.

Upon receiving the second signal 1530b, the mobile terminal may output an application (not shown) corresponding to the item 1550a in the second region 1540b. In this case, the mobile terminal may output a visual effect to indicate the second region 1540b for a time until touch of the second signal 1530b is released in the second region 1540b after the item 1550a is selected and then dragged to the second region 1540b through the second signal 1530b.

Accordingly, the user may determine the output location of the application corresponding to the item 1550a and may check in advance where the application is output.

Figure 16:
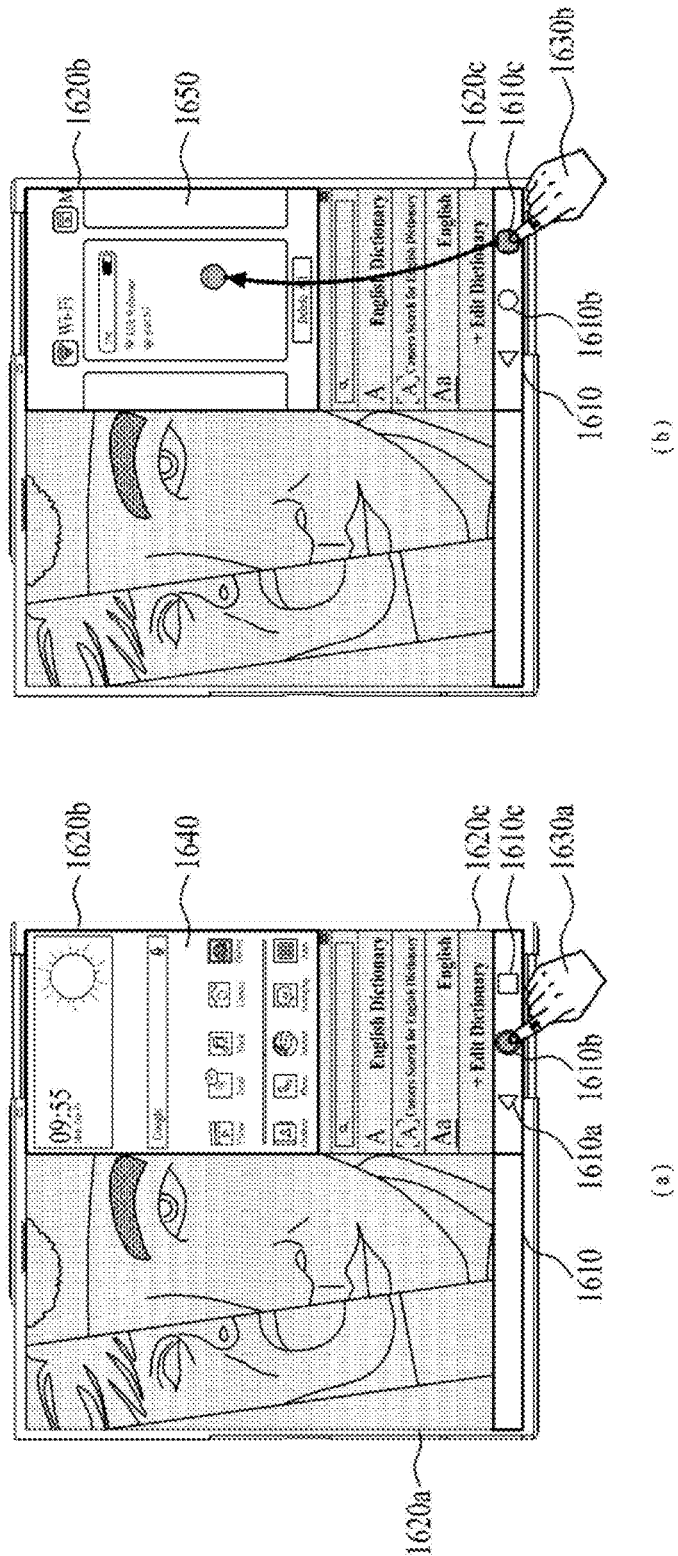
FIG. 16 is a diagram illustrating an embodiment of outputting an application in a partial region of a display in a mobile terminal according to an embodiment of the present disclosure.

FIG. 16 is a diagram illustrating an embodiment of outputting an application in a partial region of a display in a mobile terminal according to an embodiment of the present disclosure.

The mobile terminal may output a navigation bar 1610 for controlling at least one application which is being output on the display. The description of the navigation bar 1610 may refer to the embodiment of FIG. 14B.

Although the mobile terminal may control the full screen using the navigation bar 1610, the mobile terminal may individually control split regions.

That is, although not shown in the drawing, the mobile terminal may output a home screen or a list of recently used applications on the full screen, based on a signal for controlling the navigation bar 1610, when one application is output on the full screen in the enlarged display mode.

Hereinafter, an embodiment of controlling split regions based on a signal for selecting the navigation bar 1610 in a state in which two or more applications have been output in the enlarged display mode will be described.

Referring to FIG. 16(a), the mobile terminal may execute different applications in a first region 1620a, a second region 1620*b*, and a third region 1630*c* in the enlarged display mode. The mobile terminal may output the navigation bar 1610.

In an embodiment of the present disclosure, the mobile terminal may receive a first signal 1630*a* for selecting a home button 1610*b* included in the navigation bar 1610 in a state in which the second region 1620*b* is focused. Here, the first signal 1630*a* may correspond to a long-touch input signal for touching the home button 1610*b* for a preset time.

More specifically, the mobile terminal may maintain a state in which the second region 1620*b* is focused by touching the second region 1620*b*. In addition, the mobile terminal may maintain a state in which the second region 1620*b* is focused by using an application output in the second region 1620*b*. In this case, the mobile terminal may output a visual effect to indicate the remaining regions except for the second region 1620*b* which is focused.

Upon receiving the first signal 1630*a* for selecting the home button 1610*b* for a preset time while the second region 1620*b* is in a focused state, the mobile terminal may output a home screen 1640 in the second region 1620*b*.

Similarly, upon receiving a signal for selecting a back button 1610*a* or a recently used application list button 1610*c* while the second region 1620*b* is in a focused state, the mobile terminal may execute the back button 1610*a* from an application output in the second region 1620*b* or output a list of recently used applications in the second region 1620*b*.

Referring to FIG. 16(*b*), the mobile terminal may execute different applications in the first region 1620*a*, the second region 1620*b*, and the third region 1630*c* in the enlarged display mode. In addition, the mobile terminal may output the navigation bar 1610.

In an embodiment of the present disclosure, the mobile terminal may receive a second signal 1630*b* for selecting the recently used application list button 1610*c* and then dragging the recently used application list button 1610*c* to the second region 1620*b*. For example, the user may touch the recently used application list button 1610*c* and then drag the recently used application list button 1610*c* to the second region 1620*b*.

Upon receiving the second signal 1630*b*, the mobile terminal may output a recently used application list 1650 in the second region 1620*b*. Similarly, upon receiving a signal for selecting the home button 1610*b* and then dragging the home button 1610*b* to the second region 1620*b*, it is apparent that the mobile terminal may output a home screen in the second region 1620*b*.

That is, unlike the embodiment of FIG. 16(*a*), the mobile terminal may execute a function corresponding to a button included in the navigation bar 1610 in a split region based on a touch and drag input signal of the user.

FIGS. 17A to 17D are diagrams illustrating embodiments of outputting an application corresponding to an event in a reduced display mode in a mobile terminal according to an embodiment of the present disclosure.

Figure 17A:
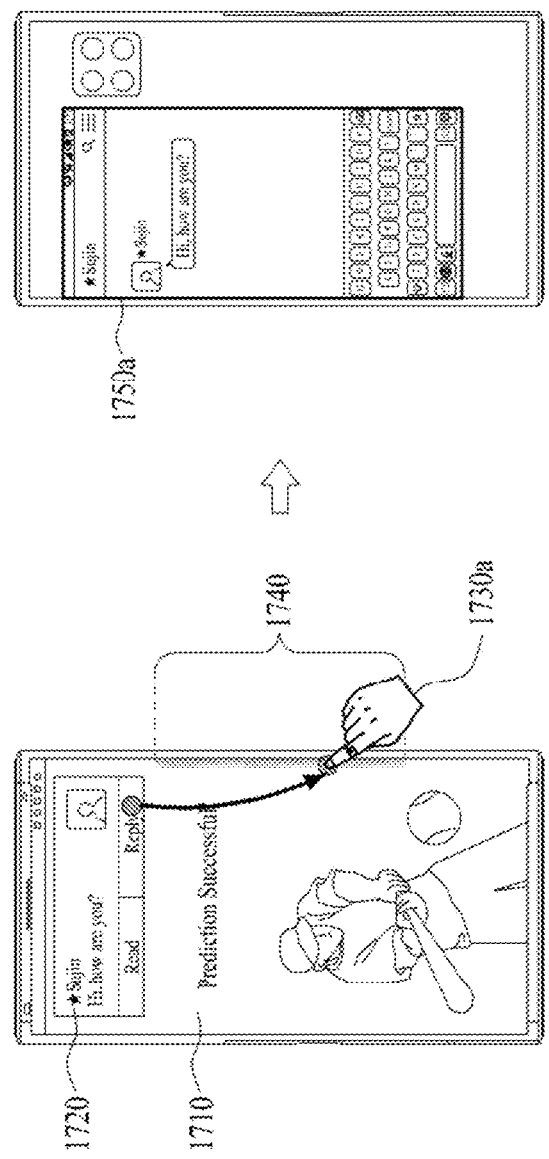
FIGS. 17A to 17D are diagrams illustrating embodiments of outputting an application corresponding to an event in a reduced display mode in a mobile terminal according to an embodiment of the present disclosure.

FIG. 17A is a diagram illustrating an embodiment of outputting an application corresponding to an event in a display region viewed from a rear face of a body in the reduced display mode in the mobile terminal according to an embodiment of the present disclosure.

Referring to the left drawing of FIG. 17A, the mobile terminal may output an application 1710 on the display in the reduced display mode. Upon receiving an event while the application 1710 is being output, the mobile terminal may output an event generation window 1720 corresponding to the received event.

In an embodiment of the present disclosure, the mobile terminal may control output of an application corresponding to the event in a first region 1750*a* based on a first signal 1730*a* for confirming the received event. For example, when the received event is a message, the user may touch a "reply" button included in the event generation window 1720 and then drag the "replay" button to a first edge region 1740*a*.

More specifically, the mobile terminal may receive the first signal 1730*a* for selecting the event generation window 1720 and then dragging the event generation window 1720 to the first edge region 1740*a*. Here, the first edge region 1740*a* may be located in an edge from which the display of the mobile terminal is extended. For example, when the second frame of the mobile terminal is located on the right side so that the display of the mobile terminal is extended in the right direction, the first edge region 1740*a* may be located on the right side of the reduced display.

Referring to the right drawing of FIG. 17A, the mobile terminal may control output of the application corresponding to the event in a first region 1750*a* based on the first signal 1730*a*. Here, the first region 1750*a* may be a display region viewed from a rear face of the body.

That is, upon receiving the first signal 1730*a* for the event received in the reduced display mode, the mobile terminal may output the application corresponding to the event in the first region 1750*a* viewed from a rear face of the body.

This is because it may not be proper to output the application corresponding to the event by dividing a display region since the area of the display viewed from a front face of the body is narrow in the reduced mode. Accordingly, the mobile terminal may use the display region viewed from the rear face of the display so that the user may flexibly use the front and rear faces of the display.

Figure 17B:
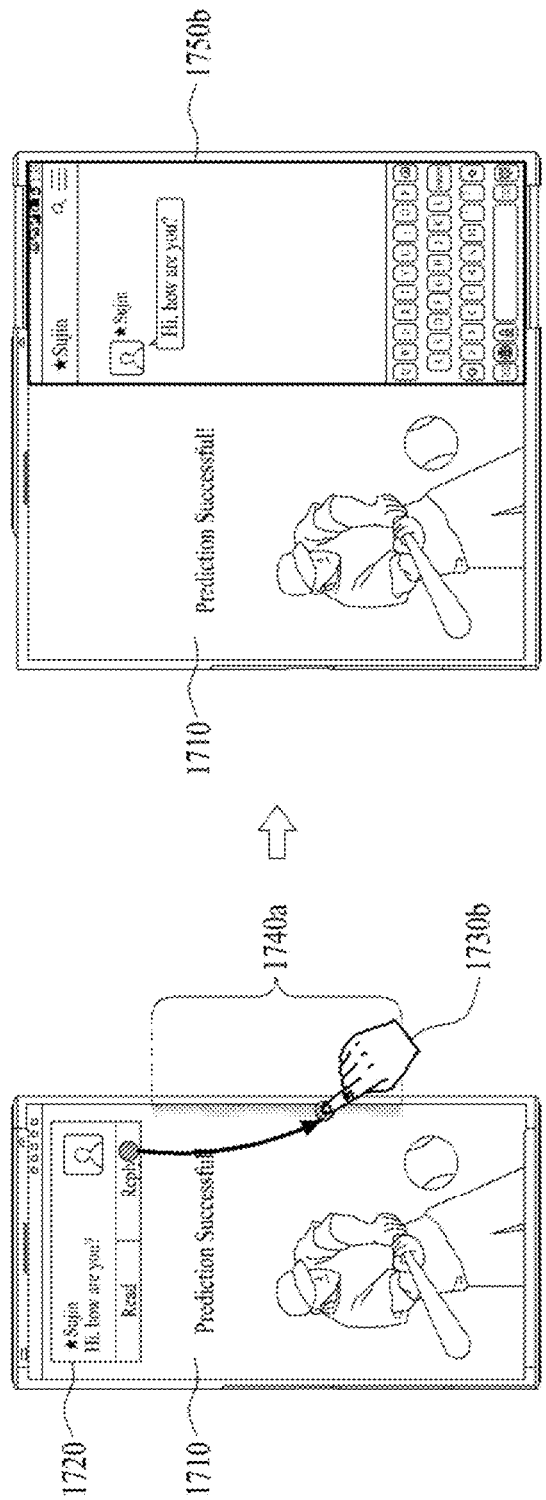

FIG. 17B is a diagram illustrating an embodiment of outputting an application corresponding to an event in a display region viewed from a front face of a body in a reduced display mode in a mobile terminal according to an embodiment of the present disclosure. Hereinafter, the embodiment of FIG. 17B may refer to the description of FIG. 17A.

The left drawing of FIG. 17B corresponds to the left drawing of FIG. 17A. That is, the mobile terminal may output the application 1710 on the display in the reduced display mode. Upon receiving an event while the application 1710 is being output, the mobile terminal may output the event generation window 1720 corresponding to the received event.

In an embodiment of the present disclosure, the mobile terminal may control switching of the display to the enlarged display mode based on a second signal 1730*b* for confirming the received event and control output of the application corresponding to the event in a second region 1750*b*.

More specifically, similarly to the case in FIG. 17A, the mobile terminal may receive the second signal 1730*b* for selecting the event generation window 1720 and then dragging the event generation window 1720 to a first edge region 1740*a*. In this case, the second signal 1730*b* may correspond to a signal which is the same as or different from the first signal 1730*a*.

Referring to the right drawing of FIG. 17B, the mobile terminal may control switching of the display to the enlarged display mode based on the second signal 1730*b* and control output of the application corresponding to the event in the second region 1750*b*. Here, the second region 1750*b* may be a split region of the display viewed from a front face of the body.

That is, upon receiving the second signal 1730*b* for the event received in the reduced display mode, the mobile terminal may extend the display and output the application corresponding to the event in the second region 1750*b* which is a split region of the extended displayed while output of the application 1710, which has been output, is maintained.

This is because it is difficult for the mobile terminal to output the application corresponding to the event in the reduced display mode since the area of the display region viewed from the front face of the body is narrow in the reduced display mode. Accordingly, the mobile terminal may automatically switch the display to the enlarged display mode based on a signal for confirming the received event and output the application corresponding to the event in a split region of the display.

In an embodiment of the present disclosure, the first signal 1730*a* of FIG. 17A may be the same as or different from the second signal 1730*b* of FIG. 17B. When the first signal 1730*a* and the second signal 1730*b* are the same signal, the mobile terminal may determine whether to output the application corresponding to the event in a display region viewed from a rear surface of the body or in the enlarged display mode, based on the type and attributes of the event. On the other hand, when the first signal 1730*a* and the second signal 1730*b* are different signals, the mobile terminal may determine the output position of the application corresponding to the event based on a received signal. The mobile terminal may determine the output position of the application corresponding to the event, based on a signal received by default or according to user setting.

Figure 17C:
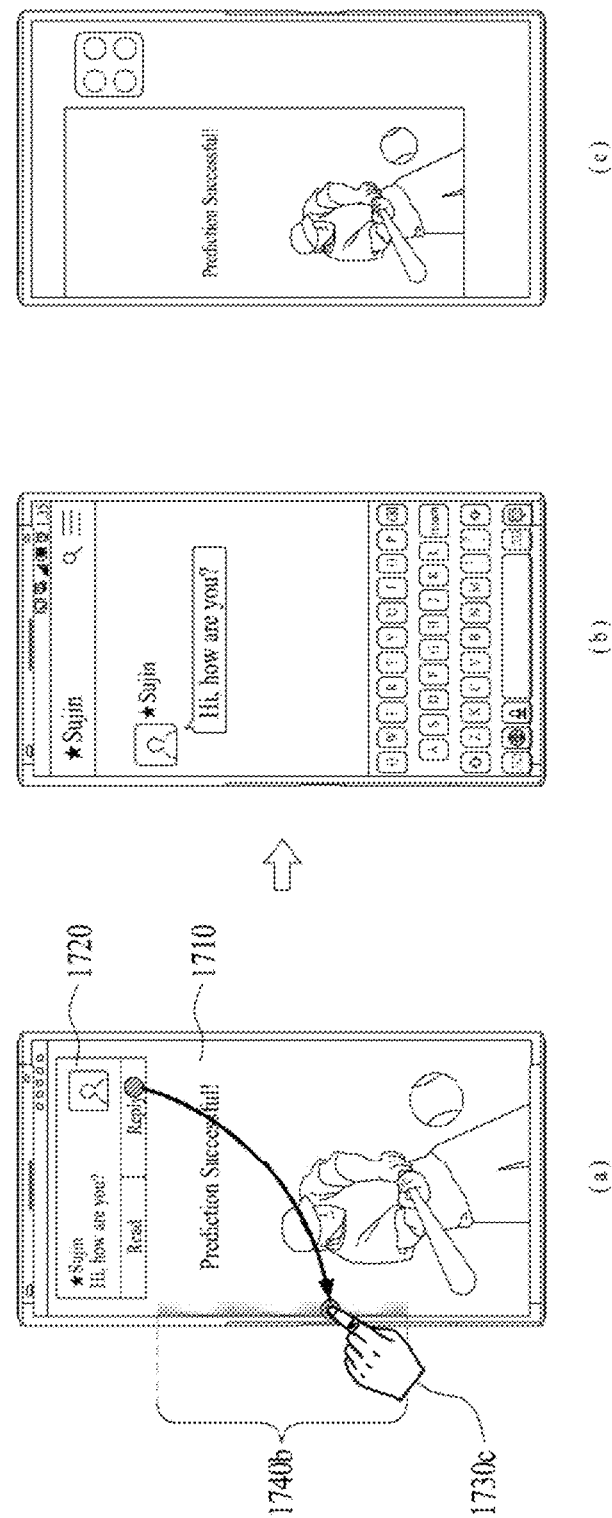

FIG. 17C is a diagram illustrating another embodiment of outputting an application corresponding to an event in a reduced display mode in a mobile terminal according to an embodiment of the present disclosure. Hereinafter, the embodiment of FIG. 17C may refer to the description of FIG. 17A.

In an embodiment of the present disclosure, the mobile terminal may control output of the application 1710 in a display region viewed from the rear face of the body based on a third signal 1730*c* and control output of an application corresponding to an event in a display region viewed from the front face of the body.

FIG. 17C(a) corresponds to the left drawing of FIG. 17A. That is, the mobile terminal may output the application 1710 in the display region viewed from the front face of the body in the reduced display mode. Upon receiving an event in a state in which the application 1710 is being output, the mobile terminal may output the event generation window 1720 corresponding to the received event.

In an embodiment of the present disclosure, the mobile terminal may receive the third signal 1730*c* for selecting the event generation window 1720 and then dragging the event generation window 1720 to a second edge region 1740*b*. Here, the second edge region 1740*b* is located on the opposite side of an edge from which the display of the mobile terminal is extended. For example, when the second frame of the mobile terminal is located on the right side and the mobile terminal is extended in the right direction, the second edge region 1740*b* may be located in the left region of the reduced display.

Referring to FIGS. 17C(b) and 17C(c), the mobile terminal may output the application corresponding to the event in the display region viewed from the front face of the body based on the third signal 1730*c* and output an application which has been output in the display region viewed from the rear face of the body. That is, FIG. 17C(b) is a diagram illustrating the front face of the mobile terminal and FIG. 17C(c) is a diagram illustrating the rear face of the mobile terminal.

That is, unlike the embodiment of FIG. 17A, when the third signal 1730*c* is a signal for dragging the event generation window 1720 to the opposite side of the edge from which the display is extended, the mobile terminal may output the application 1710, which has been output, in the display region viewed from the rear face of the body and output the new application corresponding to the event in the display region viewed from the front face of the body.

Accordingly, the mobile terminal may determine the output position of the application corresponding to the event based on the direction of the signal for selecting the event generation window 1720.

Figure 17D:
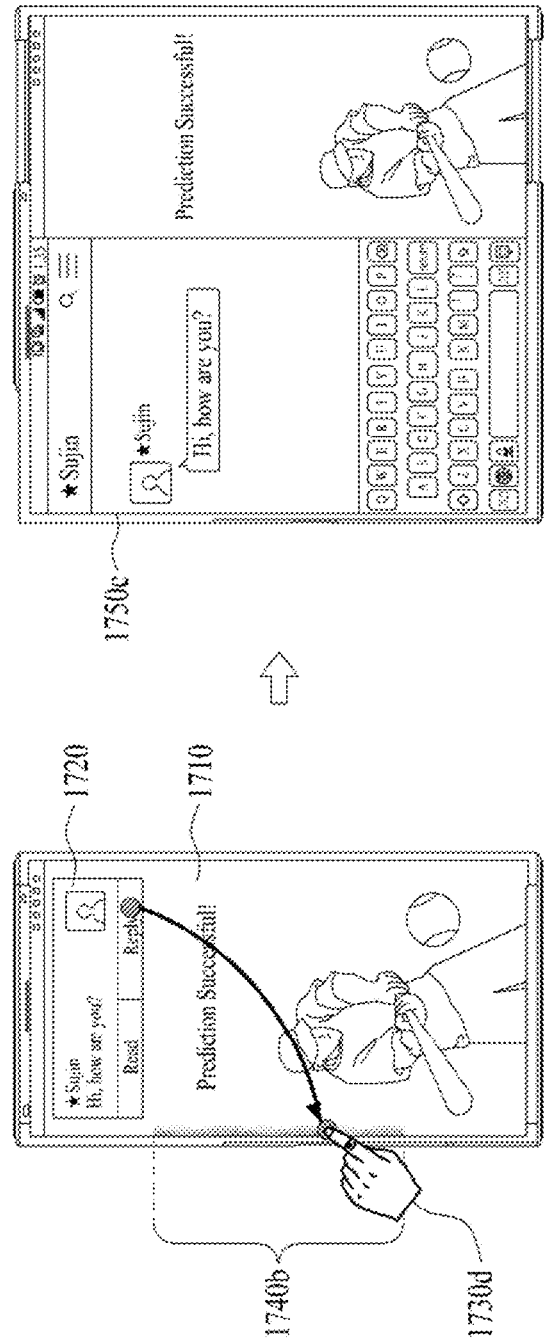

FIG. 17D is a diagram illustrating another embodiment of outputting an application corresponding to an event in a reduced display mode in a mobile terminal according to an embodiment of the present disclosure. Hereinafter, the embodiment of FIG. 17D may refer to the description of FIG. 17A.

The left drawing of FIG. 17D corresponds to the left drawing of FIG. 17A. That is, the mobile terminal may output the application 1710 on the display in the reduced display mode. Upon receiving an event while the application 1710 is being output, the mobile terminal may output the event generation window 1720 corresponding to the received event.

In an embodiment of the present disclosure, the mobile terminal may control switching of the display to the enlarged display mode based on a fourth signal 1730*d* for confirming the received event and control output of an application corresponding to the event in a third region 1750*c*.

More specifically, the mobile terminal may receive the fourth signal 1730*d* for selecting the event generation window 1720 and then dragging the event generation window 1720 to a second edge region 1740*b*. In this case, the fourth signal 1730*d* may be the same or different signal from the third signal 1730*c*. For this, reference is made to the above description.

Referring to the right drawing of FIG. 17D, the mobile terminal may control switching of the display to the enlarged display mode based on the fourth signal 1730*d* and control output of an application corresponding to the event in the third region 1750*c*. Here, the third region 1750*c* may be a partial region of the display viewed from the front face of the body. In addition, the third region 1750*c* may be a region near to the second edge region 1740*b*. That is, since the mobile terminal may extend the display based on the fourth signal 1730*d* and output two applications by dividing a region of the extended display because the mobile terminal needs to simultaneously output the two applications.

In FIG. 17B, the mobile terminal outputs the application corresponding to the event in the second region 1750*b* near the first edge region 1740*a* based on the second signal 1730*b*, whereas, in FIG. 17D, the mobile terminal may output the application corresponding to the event in the third region 1750*c* near the second edge region 1740*b* based on the fourth signal 1730*d*.

In an embodiment of the present disclosure, upon receiving the fourth signal 1730*d* for the event in the reduced display mode, the mobile terminal may extend the display, output the application 1710, which has been output, in a region near the second frame among split regions, and output the application corresponding to the event in a region separately far from the second frame among the split regions.

That is, the mobile terminal may determine the output position of the application corresponding to the event based on an input direction of a signal for the event generation window.

In addition, although FIGS. 17A to 17D illustrate embodiments of outputting the application corresponding to the event in a different region based on the signal for the event, it is apparent that the embodiments may be similarly applied to an embodiment of outputting an application based on a signal for selecting an item included in a setting window or a signal for selecting an application included in a recently used application list.

While the drawings have been separately described for convenience of description, it is also possible to design a new embodiment to be implemented by integrating the embodiments described in respective drawings.

Figure 18:
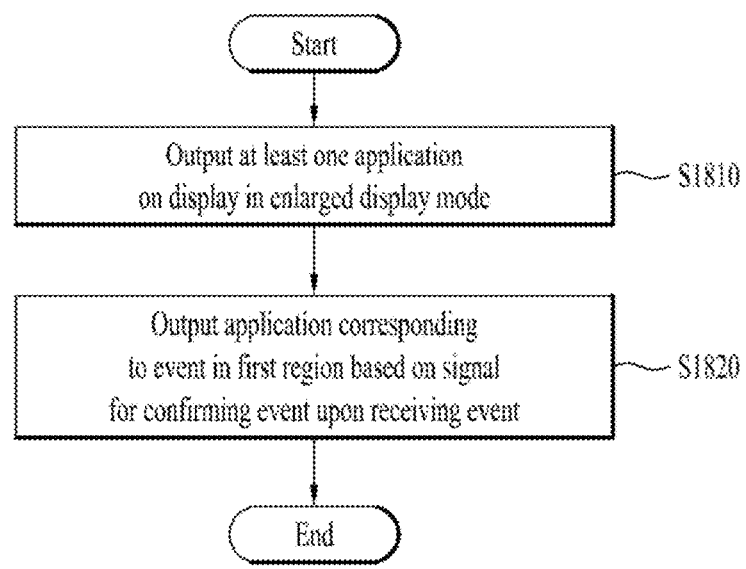
FIG. 18 is a flowchart illustrating an embodiment of outputting an application corresponding to an event in an enlarged display mode in a mobile terminal according to an embodiment of the present disclosure and FIG. 19 is a flowchart illustrating an embodiment of outputting an application corresponding to an event in a reduced display mode in a mobile terminal according to an embodiment of the present disclosure.

FIG. 18 is a flowchart illustrating an embodiment of outputting an application corresponding to an event in an enlarged display mode in a mobile terminal according to an embodiment of the present disclosure. Each step of FIG. 18 described below may be controlled by the controller of FIG. 1.

The mobile terminal performing a control method of FIG. 18 characteristically includes a display coupled to a body so that a display region viewed from a front face of the body is changeable according to switching between the enlarged display mode and the reduced display mode.

In step S1810, the mobile terminal may output at least one application on the display in the enlarged display mode.

In step S1820, upon receiving an event, the mobile terminal may output an application corresponding to the event in a first region based on a signal for confirming the event.

In an embodiment of the present disclosure, when a preset application is being output in the enlarged display mode, the first region may be an event application region, and when the preset application is not being output in the enlarged display mode, the first region may be a main region of the enlarged display mode.

In an embodiment of the present disclosure, the preset application may be a video playback application.

In an embodiment of the present disclosure, the event application region may be a region with a history in which the application corresponding to the event has been executed.

In an embodiment of the present disclosure, the mobile terminal may output an event generation window corresponding to the event and output the application corresponding to the event in a second region based on a first signal for selecting the event generation window. In addition, the mobile terminal may output the application corresponding to the event in a pop-up window based on a second signal for selecting the event generation window.

In an embodiment of the present disclosure, the event generation window may be output in a region with a history in which the application corresponding to the event has been executed in the past.

In an embodiment of the present disclosure, when the mobile terminal is outputting one application on a full screen in the enlarged display mode upon receiving the event, the mobile terminal may output a visual effect to indicate a region in which the application corresponding to the event is capable of being output, based on the signal for confirming the event.

In an embodiment of the present disclosure, the mobile terminal may output a setting window and output an application corresponding to an item in a preset region based on a signal for selecting the item included in the setting window.

Figure 19:
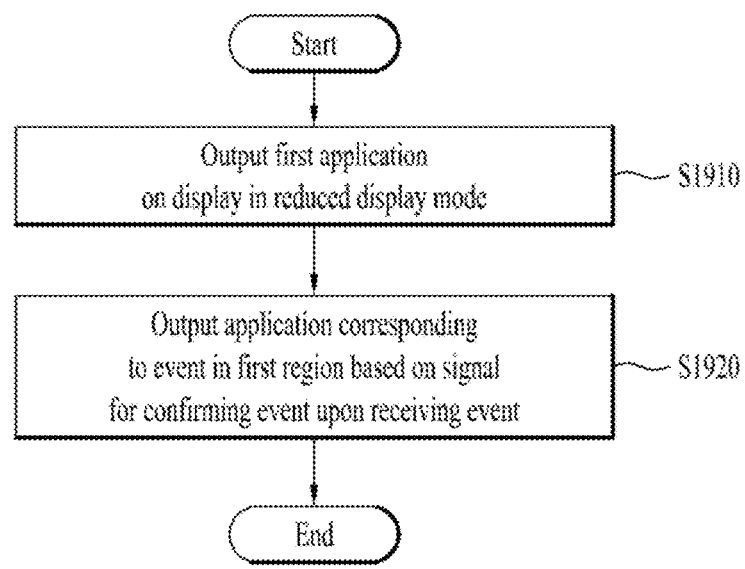

FIG. 19 is a flowchart illustrating an embodiment of outputting an application corresponding to an event in a reduced display mode in a mobile terminal according to an embodiment of the present disclosure. Each step of FIG. 19 described below may be controlled by the controller of FIG. 1.

The mobile terminal performing a control method of FIG. 19 characteristically includes a display coupled to a body so that a display region viewed from a front face of the body is changeable according to switching between the enlarged display mode and the reduced display mode.

In step S1910, the mobile terminal may output at least one application on the display in the reduced display mode.

In step S1920, upon receiving an event, the mobile terminal may control output of an application corresponding to the event in a first region based on a signal for confirming the event.

In an embodiment of the present disclosure, the first region may be a display region viewed from a rear face of the body. In another embodiment of the present disclosure, the mobile terminal may switch the display to the enlarged display mode based on the first signal and the first region may be a display region viewed from the front face of the body. In this case, the mobile terminal may determine the position of the first region based on an input direction of the first signal.

In another embodiment of the present disclosure, the mobile terminal may output a first application in a display region viewed from the rear face of the body based on the first signal and output the application corresponding to the event in a display region viewed from the front face of the body.

The embodiments described above with reference to FIGS. 11A to 17D may be performed as the control methods of the mobile terminal as illustrated in FIGS. 18 and 19.

Effects of the mobile terminal according to the present disclosure and the control method therefor are as follows.

According to at least one of the embodiments of the present disclosure, upon receiving an event in an enlarged display mode, the mobile terminal may output an application corresponding to the received event on a split screen.

According to at least one of the embodiments of the present disclosure, upon receiving an event in a reduced display mode, the mobile terminal may output an application corresponding to the received event in an extended display region or in a rear display region.

The above-described present disclosure may be implemented as computer-readable code on a computer-readable medium in which a program is recorded. The computer-readable medium may be any type of recording device in which data that may be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer may include the controller 180 of the terminal. It will be apparent to those skilled in the art that various modifications and variations may be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

The present disclosure is industrially applicable to a mobile terminal and is repeatedly applicable.

What is claimed is:

1. A mobile terminal comprising:
a body;
a display coupled to the body, wherein a display region viewable from a front face of the body is variable according to switching between an enlarged display mode and a reduced display mode, wherein the display includes a flexible display surrounding a front, a side, and a rear of the body; and
a controller,
wherein the controller is configured to:
move a display portion positioned on the side of the body to the front of the body and move a display portion positioned on the rear of the body to the front of the body via the side of the body when the display is switched to the enlarged display mode;
control output of at least one application at the display in the enlarged display mode;
determine whether the at least one application at the display in the enlarged display mode includes a preset application, wherein the preset application is designated by user setting; and
control, upon receiving an event, output of an application corresponding to the event at a first region based on a signal for confirming the received event, and
wherein the first region is an event application region when the preset application is being output in the enlarged display mode, and the first region is a main region of the enlarged display mode when the preset application is not being output in the enlarged display mode, and
wherein the event application region is a region having a history in which the application corresponding to the event has been executed.

2. The mobile terminal of claim 1, wherein the preset application is a video playback application.

3. The mobile terminal of claim 1, wherein the controller is further configured to control output of an event generation window corresponding to the received event, and control output of the application corresponding to the event at a second region based on a first signal for selecting the event generation window.

4. The mobile terminal of claim 3, wherein the controller is further configured to control output of the application corresponding to the event at a pop-up window based on a second signal for selecting the event generation window.

5. The mobile terminal of claim 3, wherein the event generation window is output at a region having a history in which the application corresponding to the event has been executed.

6. The mobile terminal of claim 1, wherein the controller is further configured to control, upon receiving the event, output of a visual effect to indicate a region at which the application corresponding to the event is capable of being output based on the signal for confirming the event, while an application is being output on a full screen in the enlarged display mode.

7. The mobile terminal of claim 1, wherein the controller is further configured to control output of a setting window, and control, based on a signal for selecting an item included in the setting window, output of an application corresponding to the item at a third region.

8. The mobile terminal of claim 1, wherein the second region is a display region viewable from a rear face of the body.

9. The mobile terminal of claim 1,
wherein the controller is further configured to:
control output of a first application at the display in a reduced display mode; and
control, upon receiving a second event, output of an application corresponding to the second event at a second region based on a first signal for confirming the second event when the mobile terminal is in the reduced display mode.

10. The mobile terminal of claim 9,
wherein the controller is further configured to switch the display to the enlarged display mode based on the first signal, and
wherein the second region is the display region viewable from the front face of the body.

11. The mobile terminal of claim 10, wherein the controller is further configured to determine a position of the second region based on a drag direction of the first signal, wherein the first signal is a touch and drag input signal received by the mobile terminal.

12. The mobile terminal of claim 9, wherein the controller is further configured to control output of the first application at a display region viewable from a rear face of the body based on the first signal, and control output of the application corresponding to the second event at the display region viewable from the front face of the body.

13. A method of controlling a mobile terminal including a display coupled to a body, the display having a display region viewable from a front face of the body that is variable according to switching between an enlarged display mode and a reduced display mode, wherein the display includes a flexible display surrounding a front, a side, and a rear of the body, the method comprising:
moving a display portion positioned on the side of the body to the front of the body and moving a display portion positioned on the rear of the body to the front of the body via the side of the body when the display is switched to the enlarged display mode;
outputting at least one application at the display in the enlarged display mode;
determining whether the at least one application at the display in the enlarged display mode includes a preset application, wherein the preset application is designated by user setting; and
outputting, upon receiving an event, an application corresponding to the event at a first region based on a signal for confirming the event,
wherein the first region is an event application region when the preset application is being output in the enlarged display mode, and the first region is a main region of the enlarged display mode when the preset application is not being output in the enlarged display mode, and
wherein the event application region is a region having a history in which the application corresponding to the event has been executed.

14. The method of claim 13, further comprising:
controlling output of a first application at the display in a reduced display mode; and
controlling, upon receiving a second event, output of an application corresponding to the second event at a second region based on a first signal for confirming the second event when the mobile terminal is in the reduced display mode.

\* \* \* \* \*